United States Patent
Araki et al.

(10) Patent No.: US 6,195,239 B1
(45) Date of Patent: Feb. 27, 2001

(54) MAGNETORESISTANCE EFFECT FILM AND MAGNETORESISTANCE EFFECT TYPE HEAD

(75) Inventors: Satoru Araki; Masashi Sano; Yoshihiro Tsuchiya, all of Saku (JP)

(73) Assignee: TDK Corporation, Tokyo (JP)

(*) Notice: Subject to any disclaimer, the term of this patent is extended or adjusted under 35 U.S.C. 154(b) by 0 days.

(21) Appl. No.: 09/260,727

(22) Filed: Mar. 2, 1999

(30) Foreign Application Priority Data

Mar. 6, 1998 (JP) ................................................. 10-073175

(51) Int. Cl.$^7$ ....................................................... G11B 5/33
(52) U.S. Cl. ........................................................... 360/324.11
(58) Field of Search ............................... 360/324, 324.1, 360/324.11, 325

(56) References Cited

U.S. PATENT DOCUMENTS

| | | | |
|---|---|---|---|
| 5,287,237 | * | 2/1994 | Kitada et al. ........................ 360/113 |
| 5,552,949 | * | 9/1996 | Hashimoto et al. ................. 360/113 |
| 5,691,864 | * | 11/1997 | Saito .................................... 360/113 |
| 5,756,191 | * | 5/1998 | Hashimoto et al. ................. 428/209 |
| 5,777,542 | * | 7/1998 | Ohsawa et al. ..................... 338/32 R |
| 5,862,022 | | 1/1999 | Noguchi et al. .................... 360/324.2 |
| 5,892,641 | * | 4/1999 | Ishiwata .............................. 360/113 |
| 5,919,580 | * | 7/1999 | Barnard et al. ..................... 428/692 |
| 5,958,576 | * | 9/1999 | Takiguchi ........................... 428/332 |
| 5,958,611 | * | 9/1999 | Ohta et al. .......................... 428/692 |

FOREIGN PATENT DOCUMENTS 9-148651 * 6/1997 (JP).

* cited by examiner

Primary Examiner—Hoa T. Nguyen
Assistant Examiner—Julia Anne Watko
(74) Attorney, Agent, or Firm—Oblon, Spivak, McClelland, Maier & Neustadt, P.C.

(57) ABSTRACT

In a spin valve type magnetoresistance effect film, an antiferromagnetic layer is made of $M_xMn_{100-x}$ wherein M represents at least one selected from Ru, Rh, Re, Pt, Pd, Au, Ag, Fe, Ni, Ir and Cr, and $15 \leq x \leq 58$ (unit of x: atomic %), and a protective layer formed thereon is made of at least one selected from Rh, Ru, Zr and Ti. With this arrangement, a magnetoresistance effect film highly excellent in thermal stability and small in deterioration of the MR ratio, as well as a magnetoresistance effect type head having such a magnetoresistance effect film can be obtained.

19 Claims, 11 Drawing Sheets

MAGNETORESISTANCE EFFECT FILM AND MAGNETORESISTANCE EFFECT TYPE HEAD

BACKGROUND OF THE INVENTION

1. Field of the Invention

The present invention relates to a magnetoresistance effect film for reading the magnetic field intensity of a magnetic recording medium or the like as a signal and, in particular, to a magnetoresistance effect film which is capable of reading a small magnetic field change as a greater electrical resistance change signal, and further relates to a magnetoresistance effect type head using such a magnetoresistance effect film.

2. Description of the Prior Art

Recently, there has been the development for increasing the sensitivity of magnetic sensors and increasing the density in magnetic recording and, following this, magnetoresistance effect type magnetic sensors (hereinafter referred to as MR sensors) and magnetoresistance effect type magnetic heads (hereinafter referred to as MR heads) using magnetoresistance change have been actively developed. Both MR sensors and MR heads are designed to read out external magnetic field signals on the basis of the variation in resistance of a reading sensor portion formed of magnetic material. The MR sensors have an advantage that a high sensitivity can be obtained and the MR heads have an advantage that a high output can be obtained upon reading out signals magnetically recorded in high density because the reproduced output does not depend on the relative speed of the sensors or heads to the recording medium.

However, conventional MR sensors which are formed of magnetic materials such as $Ni_{80}Fe_{20}$ (Permalloy), NiCo or the like have a small resistance change ratio $\Delta R/R$ which is about 1 to 3% at maximum, and thus these materials have insufficient sensitivity as the reading MR head materials for ultrahigh density recording of the order of several GBPSI (Giga Bits Per Square Inches) or more.

Attention has been recently paid to artificial lattices having the structure in which thin films of metal having a thickness of an atomic diameter order are periodically stacked, because their behavior is different from that of bulk metal. One of such artificial lattices is a magnetic multilayered film having ferromagnetic metal thin films and non-magnetic metal thin films alternately deposited on a substrate. Heretofore, magnetic multilayered films of an iron-chromium type, a cobalt-copper type and the like have been known. However, these artificial lattice magnetic multilayered films are not commercially applicable as they are because the external magnetic field at which a maximum resistance change occurs (operating magnetic field intensity), is as high as several tens of kilo-oersted.

Under these circumstances, a new structure which is called a spin valve has been proposed. In this structure, two NiFe layers are formed via a non-magnetic metal layer, and an FeMn layer is further formed so as to be adjacent to one of the NiFe layers.

In this case, since the FeMn layer and the NiFe layer adjacent thereto are directly exchange-coupled to each other, the direction of the magnetic spin of this NiFe layer is fixed in the range of several tens to several hundreds Oe in magnetic field intensity. On the other hand, the direction of the magnetic spin of the other NiFe layer is freely changeable by an external magnetic field. As a result, there can be achieved a magnetoresistance change ratio (MR ratio) of 2 to 5% in a small magnetic field range which corresponds to the degree of coercive force of the NiFe layer.

In the spin valve, by realizing a difference in relative angles of spins between two magnetic layers, the large MR change which differs from the conventional anisotropy magnetoresistance (AMR) effect is accomplished. This is realized by pinning of the magnetic layer spin due to the direct exchange coupling force between one of the magnetic layers and the antiferromagnetic layer. This exchange coupling can be the substance of the spin valve.

However, for putting the spin valve to practical use, there are various problems as described hereinbelow. The strength of the exchange coupling pinning the magnetic layer is represented by a magnitude of a unidirectional anisotropic magnetic field Hua which shifts. On the other hand, a temperature at which Hua is lost is set to be a blocking temperature Tb which represents a thermal stability. The generally used FeMn layers and other antiferromagnetic layers have the following problems with respect to the exchange coupling:

(1) The blocking temperature Tb is low, that is, in the range from 150 to 170° C. As compared with the state of the bulk, the blocking temperature Tb is low so that an excellent thin film which can fully achieve an expected pinning effect can not be obtained.

(2) Dispersion of the blocking temperatures Tb occurs. Specifically, because of a thin film, the film surface of the FeMn layer is composed of various crystal grains, and the individual crystal grains have their own blocking temperatures Tb. If all the crystal grains have the same blocking temperature Tb, no problem is raised. However, actually, some crystal grains have lower blocking temperatures Tb, while some crystal grains have higher blocking temperatures Tb. As a result, it is possible that there exist those grains with small exchange coupling which causes reversal of the spin, in the ferromagnetic layer at 80 to 120° C. representing an operating temperature range on application (due to existence of crystal grains having lower blocking temperatures Tb). Then, the spin direction of the pinned ferromagnetic layer may be inclined as a whole so that the output voltage is lowered. Thus, it is desired that a high-quality antiferromagnetic thin film be provided wherein as many crystal grains as possible have the same high blocking temperature Tb.

For solving the foregoing problems, antiferromagnetic thin films made of $Ru_xM_yMn_z$ (M represents at least one selected from Rh, Pt, Pd, Au, Ag and Re) have been proposed as preferred examples in Japanese Patent Applications Nos. 8-357608 and 9-219121.

On the other hand, as a material of a protective film which is stacked so as to be in abutment with the antiferromagnetic thin film, Ta is generally used while Cu or Hf is also used on occasion. As typical examples of the prior art, the followings can be cited.

(1) Journal of Magnetism and Magnetic Materials, 93 (1991) 101 (Dieny, IBM)

Information about a laminate structure represented by Si/Ta(50Å)/NiFe(60Å)/Cu(25Å)/NiFe(40Å)/FeMn(50Å)/Cu(50Å) is disclosed. Herein, an antiferromagnetic layer is made of FeMn, and a protective layer is made of Cu and has a thickness of 50Å.

(2) Japan Journal of Applied Physics,
33 (1994) 1327 (Nakatani, Hitachi)

Information about a laminate structure represented by Si/Hf(50Å)/NiFeCo(50Å)/Cu(20Å)/NiFeCo(50Å)/FeMn (100Å)/Hf(50Å ) is disclosed. Herein, an antiferromagnetic layer is made of FeMn, and a protective layer is made of Hf and has a thickness of 50Å.

(3) JP-A-9-147325

Information about a laminate structure represented by glass/Ta(100Å)/NiFe(50Å)/PtMn(200Å)/Ta(100Å) is disclosed. Herein, an antiferromagnetic layer is made of PtMn, and a protective layer is made of Ta and has a thickness of 100Å.

However, it has been experimentally found out that a very strict heat run test can not be cleared by merely using such conventional protective layer materials in combination with the antiferromagnetic thin films proposed in the foregoing Japanese patent applications. Specifically, (1) After carrying out an unavoidable heat treatment (for example, at 250° C. for 3 hours) in a manufacturing process, the MR ratio of a magnetoresistance effect film is lowered by about 30%. As a result, it is possible that sufficient outputs can not be ensured after completion as a spin valve head.

(2) It is possible that magnetization of a pinned ferromagnetic layer is rotated while keeping the temperature in the range of 120 to 140° C. Specifically, if a spin valve head is incorporated into a high-rotation type disk drive where the operating temperature of the head increases to 120 to 140° C., it is possible that the output is reduced with a lapse of time and finally, recorded information on a disk can not be read out.

SUMMARY OF THE INVENTION

The present invention has been made under these circumstances and has an object to provide a magnetoresistance effect film which is excellent in thermal stability and small in deterioration of the MR ratio, and further provide a magnetoresistance effect type head having such a magnetoresistance effect film.

For solving the foregoing problems, according to one aspect of the present invention, there is provided a spin valve type magnetoresistance effect film comprising a multilayered film including a non-magnetic metal layer, a ferromagnetic layer formed on one surface of the non-magnetic metal layer, a soft magnetic layer formed on the other surface of the non-magnetic metal layer, an antiferromagnetic layer which is formed on a surface of the ferromagnetic layer remote from the other surface thereof abutting the non-magnetic metal layer so as to pin a direction of magnetization of the ferromagnetic layer, and a protective layer which is formed on a surface of the antiferromagnetic layer remote from the other surface thereof abutting the ferromagnetic layer, wherein the antiferromagnetic layer substantially consists of $M_xMn_{100-x}$ where M represents at least one selected from Ru, Rh, Re, Pt, Pd, Au, Ag, Fe, Ni, Ir and Cr, and $15 \leq x \leq 58$ (unit of x: atomic %), and wherein the protective layer is made of at least one selected from Rh, Ru, Zr and Ti.

According to another aspect of the present invention, there is provided a magnetoresistance effect type head comprising a magnetoresistance effect film, conductive films and electrode portions, wherein the conductive films are conductively connected to the magnetoresistance effect film through the electrode portions, and the magnetoresistance effect film is a spin valve type magnetoresistance effect film which comprises a multilayered film including a non-magnetic metal layer, a ferromagnetic layer formed on one surface of the non-magnetic metal layer, a soft magnetic layer formed on the other surface of the non-magnetic metal layer, an antiferromagnetic layer which is formed on a surface of the ferromagnetic layer remote from the other surface thereof abutting the non-magnetic metal layer so as to pin a direction of magnetization of the ferromagnetic layer, and a protective layer which is formed on a surface of the antiferromagnetic layer remote from the other surface thereof abutting the ferromagnetic layer, wherein the antiferromagnetic layer substantially consists of $M_xMn_{100-x}$ where M represents at least one selected from Ru, Rh, Re, Pt, Pd, Au, Ag, Fe, Ni, Ir and Cr, and $15 \leq x \leq 58$ (unit of x: atomic %), and wherein the protective layer is made of at least one selected from Rh, Ru, Zr and Ti.

It is preferable that the antiferromagnetic layer substantially consists of $M_xMn_{100-x}$ where M represents at least one selected from Ru, Rh, Re, Pt, Pd, Au, Ag, Fe, Ni, Ir and Cr, and $15 \leq x \leq 58$ (unit of x: atomic %), and that the protective layer is made of at least one selected from Rh and Ru.

It is preferable that the antiferromagnetic layer substantially consists of $Ru_xM_yMn_z$ where M represents at least one selected from Rh, Pt, Pd, Au, Ag, Re, Ni and Ir, $1 \leq x \leq 30$, $1 \leq y \leq 30$, $69 \leq z \leq 90$, $10 \leq x+y \leq 31$ (unit of x, y, z: atomic %), and that the protective layer is made of at least one selected from Rh and Ru.

It is preferable that the antiferromagnetic layer substantially consists of $M_xMn_{100-x}$ where M represents at least one selected from Ru, Rh, Re, Pt, Pd, Au, Ag, Fe, Ni, Ir and Cr, and $15 \leq x \leq 58$ (unit of x: atomic %), and that the protective layer is made of at least one selected from Zr and Ti.

It is preferable that a thickness (t) of the protective layer is set in the range of $1 \text{ nm} \leq t \leq 5 \text{ nm}$.

It is preferable that the antiferromagnetic layer contains oxygen as impurities and a concentration of oxygen contained in the antiferromagnetic layer is set to 1 to 2,000 atomic ppm.

It is preferable that the antiferromagnetic layer further contains carbon, sulfur and chlorine as impurities, and that a concentration of carbon contained in the antiferromagnetic layer is set to 1 to 2,000 atomic ppm, a concentration of sulfur contained in the antiferromagnetic layer is set to 1 to 1,000 atomic ppm, and a concentration of chlorine contained in the antiferromagnetic layer is set to 1 to 2,000 atomic ppm.

It is preferable that the antiferromagnetic layer is formed by a sputtering method in a vacuum film forming apparatus degassed to an ultimate pressure of no more than $2 \times 10^{-9}$ Torr and under an atmosphere of sputtering gas introduced upon film formation, using a target of an oxygen concentration of no more than 600 ppm, and that the total concentration of impurities in the sputtering gas is set to no more than 100 ppb and a concentration of $H_2O$ in the sputtering gas is set to no more than 40 ppb.

It is preferable that the magnetoresistance effect film has a multilayered structure having the soft magnetic layer, the non-magnetic metal layer, the ferromagnetic layer, the antiferromagnetic layer and the protective layer in the order named from a side of a substrate.

DETAILED DESCRIPTION OF THE INVENTION

Hereinbelow, the concrete carrying-out mode of the present invention will be described in detail. Throughout the specification, ppm and ppb, which are the units representing the concentration, represent atomic ppm and atomic ppb.

Figure 1:
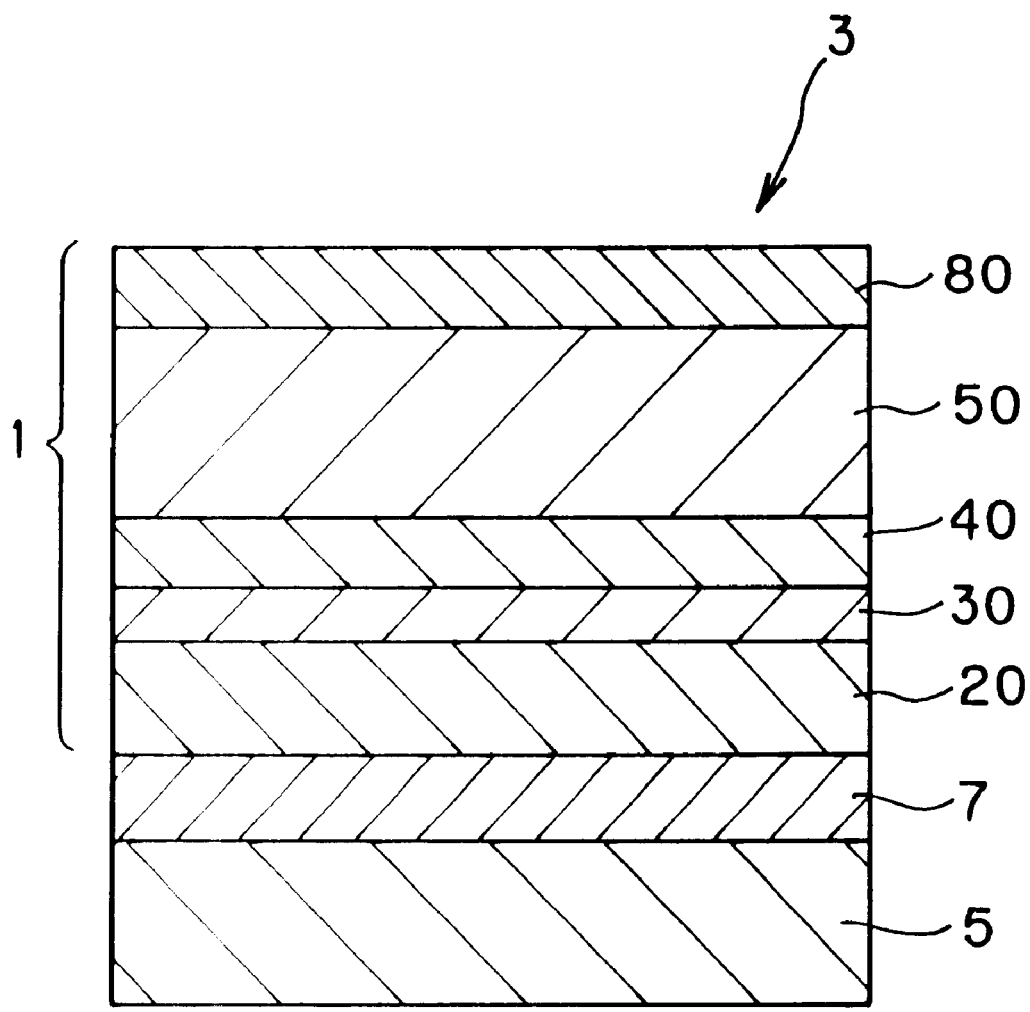
FIG. 1 is a sectional view showing a magnetoresistance effect film according to the present invention.

FIG. 1 is a sectional view showing a preferred example of a magnetoresistance effect film 3. In this carrying-out mode, the magnetoresistance effect film 3 has a magnetic multilayered film 1 as a spin valve film showing a giant magnetoresistance effect.

As shown in FIG. 1, the magnetic multilayered film 1 has a laminate body structure which comprises a non-magnetic metal layer 30, a ferromagnetic layer 40 formed on one surface of the non-magnetic metal layer 30, a soft magnetic layer 20 formed on the other surface of the non-magnetic metal layer 30, and an antiferromagnetic layer 50 which is formed on a surface of the ferromagnetic layer 40 remote from the other surface thereof abutting the non-magnetic metal layer 30 so as to pin the direction of magnetization of the ferromagnetic layer 40.

As shown in FIG. 1, the laminate body is normally formed on a substrate 5, and they are laminated from the side of the substrate 5 via an under layer 7 in the order of the soft magnetic layer 20, the non-magnetic metal layer 30, the ferromagnetic layer 40 and the antiferromagnetic layer 50. As shown in the drawing, a protective layer 80 is further formed on the antiferromagnetic layer 50.

In the magnetic multilayered film 1 (spin valve film) according to this carrying-out mode, it is required that the soft magnetic layer 20 and the ferromagnetic layer 40 which are adjacently formed at both sides of the non-magnetic metal layer 30 have substantially different magnetization directions from each other in accordance with a signal magnetic field applied from the external. The reason is as follows: In the principle of the present invention, when the magnetization directions of the soft magnetic layer 20 and the ferromagnetic layer 40 which are formed via the non-magnetic metal layer 30 interposed therebetween are deviated from each other, conduction electrons have a behavior of scattering due to spins to increase its resistance. In this case, when the magnetization directions are opposite to each other, the maximum resistance is obtained. That is, in this invention, when a signal magnetic field from the external is positive (in an upward direction with respect to a recording surface 93 of a recording medium 90 (represented by reference numeral 92)) as shown in FIG. 2, there occur mutually opposite components in the magnetization directions of the neighboring magnetic layers so that the resistance is increased.

Here, the relationship among the external signal magnetic field from the magnetic recording medium, the magnetization directions of the soft magnetic layer 20 and the ferromagnetic layer 40 and the variation of electrical resistance in the (spin valve) magnetic multilayered film used in the magnetoresistance effect film of the present invention will be described.

Now, in order to facilitate the understanding of the present invention, the simplest magnetic multilayered film in which the pair of soft magnetic layer 20 and ferromagnetic layer 40 exist via the non-magnetic metal layer 30 as shown in FIG. 1 will be described with reference to FIG. 2.

Figure 2:
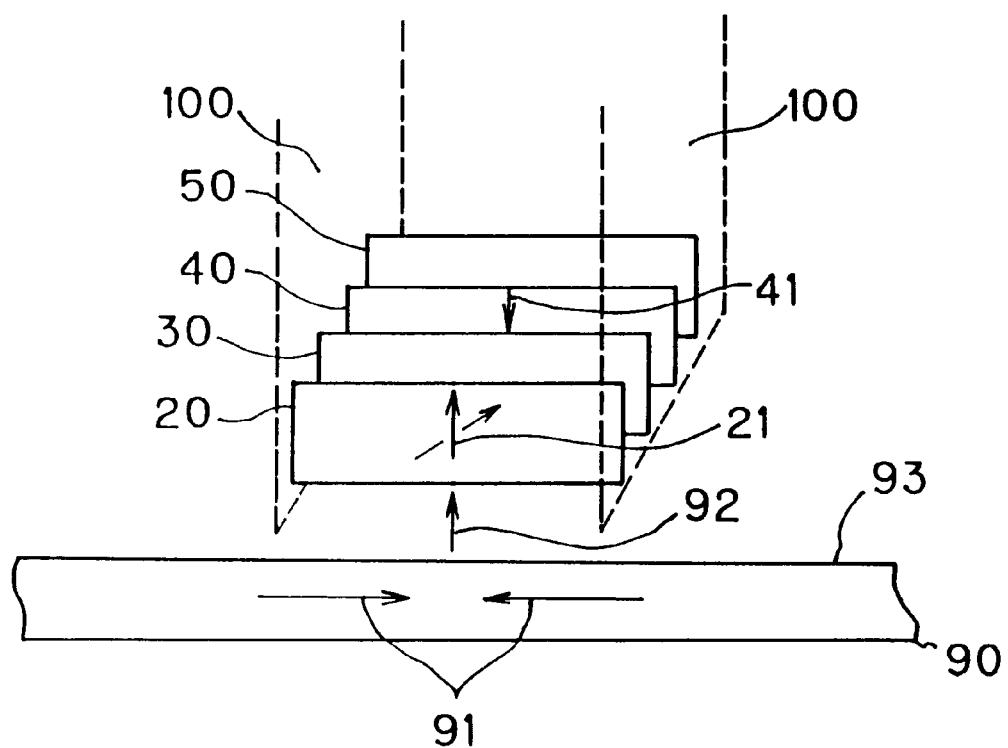
FIG. 2 is a schematic diagram showing a magnetoresistance effect film, particularly, a structure of a magnetic multilayered film, for explaining an operation of the present invention.

As shown in FIG. 2, the magnetization of the ferromagnetic layer 40 is pinned in a downward direction to the surface of the recording medium by a method as described later (see reference numeral 41). The soft magnetic layer 20 is formed via the non-magnetic metal layer 30 so that the magnetization direction thereof is varied in accordance with the signal magnetic field from the external (see reference numeral 21). At this time, the relative angle between the magnetization directions of the soft magnetic layer 20 and the ferromagnetic layer 40 is greatly varied in accordance with the direction of the signal magnetic field from the magnetic recording medium 90. As a result, the scattering degree of the conduction electrons flowing in the magnetic layers is varied, and thus the electrical resistance is greatly varied.

Accordingly, a large MR (Magneto-Resistance) effect, which essentially differs in mechanism from the anisotropic magnetoresistance effect of Permalloy, can be obtained. This is particularly called a GMR (Giant-Magneto-Resistance) effect.

Figure 3:
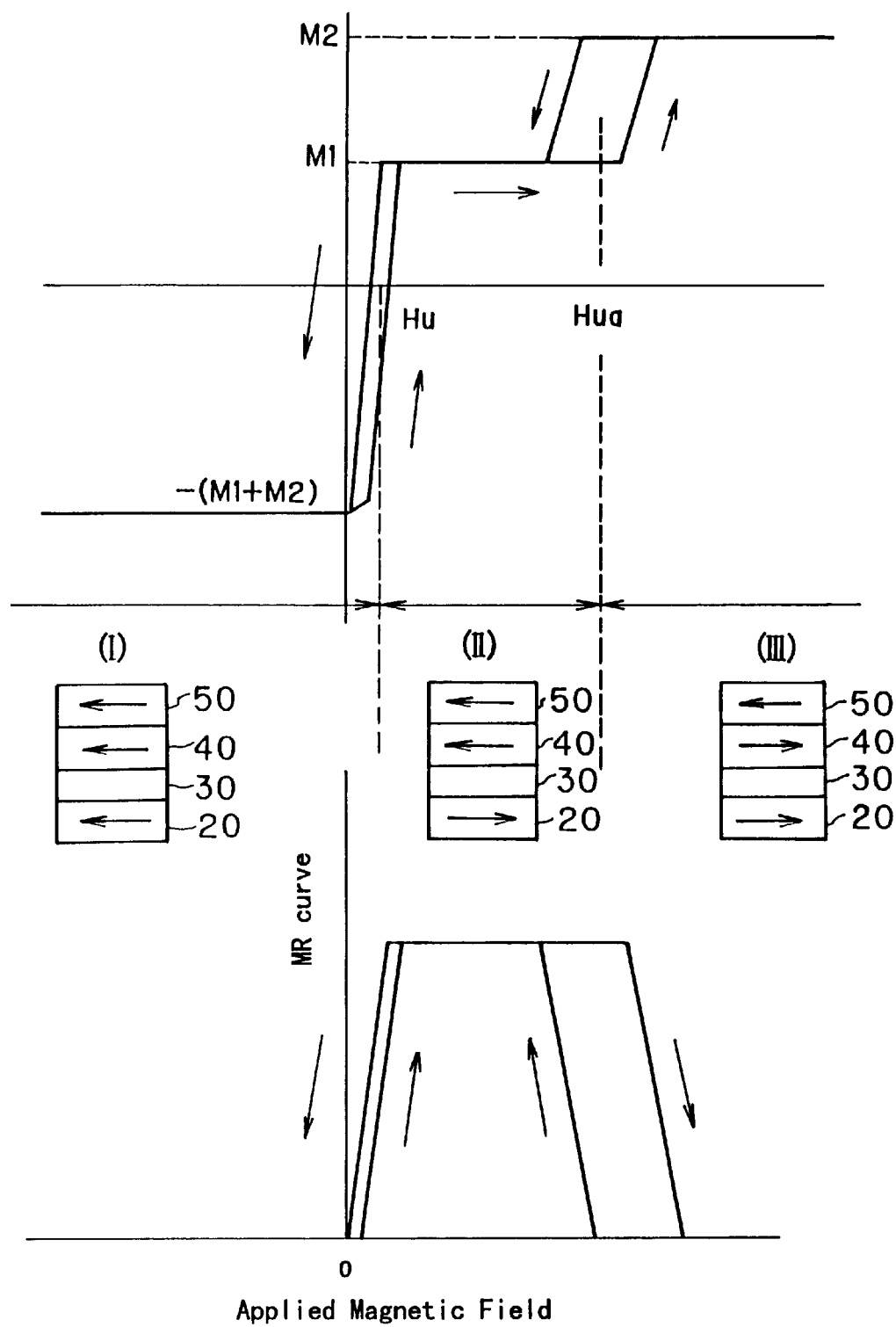
FIG. 3 is a schematic diagram showing a magnetization curve and an MR curve for explaining an operation of the present invention.

The magnetization directions of the soft magnetic layer 20, the ferromagnetic layer 40 and the antiferromagnetic layer 50 exhibiting a pinning effect are varied relative to the external magnetic field. The variation of the magnetization directions thereof is shown in FIG. 3 in correspondence with the magnetization curve and the MR curve. In this case, all the magnetization of the ferromagnetic layer 40 is fixed in a minus direction (in a downward direction with respect to the recording surface of the recording medium 90) by the antiferromagnetic layer 50. When the external signal magnetic field is minus, the magnetization of the soft magnetic layer 20 is also in the minus direction. Now, it is assumed that the coercive force of each of the soft magnetic layer 20 and the ferromagnetic layer 40 is approximate to zero in order to simplify the description. In an area (I) where the signal magnetic field H<0, the magnetization of both the soft magnetic layer 20 and the ferromagnetic layer 40 is oriented in one direction.

When the external magnetic field is intensified and H exceeds the coercive force of the soft magnetic layer 20, the magnetization direction of the soft magnetic layer is rotated in the direction of the signal magnetic field, so that the magnetization and the electrical resistance are increased as the magnetization directions of the soft magnetic layer 20 and the ferromagnetic layer 40 become antiparallel to each other. Finally, these values are fixed (state of an area (II)). At this time, a pinning magnetic field Hua is applied by the antiferromagnetic layer 50. If the signal magnetic field exceeds Hua, the magnetization of the ferromagnetic layer 40 is also rotated in the direction of the signal magnetic field, so that the magnetization of each of the soft magnetic layer 20 and the ferromagnetic layer 40 is oriented in the same direction in an area (III). At this time, the magnetization is set to a constant value, and the MR curve is equal to zero.

Conversely, when the signal magnetic field H is reduced, the magnetization is changed from the area (III) through the area (II) to the area (I) by inversion of the magnetization of the soft magnetic layer 20 and the ferromagnetic layer 40 in the same manner as described above. At an initial portion of the area (II), conduction electrons have a behavior of scattering dependent on spins, and the resistance is increased. In the area (II), the ferromagnetic layer 40 has little magnetization inversion because it is pinned, while the magnetization of the soft magnetic layer 20 increases linearly, so that the rate of spin-dependent scattered conduction electrons is gradually increased in accordance with the magnetization change of the soft magnetic layer 20. That is, if $Ni_{0.8}Fe_{0.2}$ whose Hc is low is selected for the soft magnetic layer 20 and a suitable unidirectional anisotropic magnetic field Hk is applied, a formed magnetic multilayered film has a linearly-varying resistance and a large magnetoresistance ratio in a small external magnetic field of several Oe to several tens Oe below Hk.

Hereinbelow, each constitution of the foregoing magnetoresistance effect film 3 will be described in detail. The first feature of this magnetoresistance effect film resides in a combination of a material constituting the antiferromagnetic layer 50 and a material constituting the protective layer 80 formed directly on a surface of the antiferromagnetic layer 50 remote from the other surface thereof abutting the ferromagnetic layer 40.

Specifically, the antiferromagnetic layer 50 in the present invention is substantially made of a material represented by $M_xMn_{100-x}$ with manganese (Mn) being essential, wherein M represents at least one selected from Ru, Rh, Re, Pt, Pd, Au, Ag, Fe, Ni, Ir and Cr, x takes a value in the range of $15 \leq x \leq 58$, and the unit of x is atomic %.

Among the foregoing materials of the antiferromagnetic layer 50, a material represented by $Ru_xM_yMn_z$ with manganese (Mn) and ruthenium (Ru) being essential is used for the antiferromagnetic layer 50 more preferably, wherein M represents at least one selected from Rh, Pt, Pd, Au, Ag, Re and Ir, $1 \leq x \leq 30$, $1 \leq y \leq 30$, $69 \leq z \leq 90$, $10 \leq x+y \leq 31$ (unit of x, y, z: atomic %). M in $Ru_xM_yMn_z$ generally represents one selected from the foregoing elements. In this case, the antiferromagnetic layer 50 is composed of three components, but may be composed of no less than four components in a particular case.

The protective layer 80 is formed directly on such an antiferromagnetic layer 50. The protective layer 80 is normally provided to prevent oxidation of the surface of the magnetic multilayered film in a film-forming process and improve wettability with electrode material formed thereon and adhesive strength. In the present invention, the protective layer 80 is made of at least one selected from Rh, Ru, Zr and Ti. It is preferable that each element constituting the protective layer 80 is 100% pure. On the other hand, even using an alloy containing such an element no less than 70wt %, the effect of the present invention can be achieved. Accordingly, for example, even if just referred to as "the protective layer 80 is made of Rh", an alloy containing Rh no less than 70wt % is included in the scope of the present invention. The protective layer 80 is made of preferably at least one of Rh and Ru, and more preferably Rh. Rh particularly shows an excellent effect as a protective layer for preventing oxidation and diffusion and causes a very small influence of mutual diffusion in relation to Mn being a constituent element of the antiferromagnetic layer 50 and further to Ru and Mn being constituent elements of the antiferromagnetic layer 50.

In case of a combination of materials of the antiferromagnetic layer 50 and the protective layer 80 deviating from the scope of the present invention, mutual diffusion between the materials of the antiferromagnetic layer 50 and the protective layer 80 becomes large so that the composition of the antiferromagnetic layer 50 is disordered to cause an insufficient pinning effect, leading to deterioration of the exchange coupling energy Jk. Further, induced by the foregoing mutual diffusion, the value of saturation magnetization Ms of the ferromagnetic layer 40 is also reduced.

The thickness (t) of the protective layer 80 is set to be preferably in the range of $1 \text{ nm} \leq t \leq 5$ nm, more preferably in the range of $2 \text{ nm} \leq t \leq 4$ nm. If this value becomes less than 1 nm, there is raised a disadvantage that the essential function as the protective layer can not be revealed. On the other hand, if this value exceeds 5 nm, since the materials selected in the present invention, particularly Rh and Ru, have smaller resistivity as compared with conventional Ta or the like, there is raised a disadvantage that a shunt effect of sense current occurs to reduce the MR characteristic.

Examples of particularly preferred combinations of the antiferromagnetic layers 50 and the protective layers 80 in the present invention are shown as follows.

(1) Antiferromagnetic Layer 50—RuRhMn Protective Layer 80—Rh (2) Antiferromagnetic Layer 50—RuPtMn Protective Layer 80—Rh (3) Antiferromagnetic Layer 50—RuReMn Protective Layer 80—Ru (4) Antiferromagnetic Layer 50—RuAuMn Protective Layer 80—Rh (5) Antiferromagnetic Layer 50—RuFeMn Protective Layer 80—Rh (6) Antiferromagnetic Layer 50—RhMn Protective Layer 80—Rh (7) Antiferromagnetic Layer 50—PtMn Protective Layer 80—Rh (8) Antiferromagnetic Layer 50—PtRhMn Protective Layer 80—Rh (9) Antiferromagnetic Layer 50—PtCrMn Protective Layer 80—Rh/Ru (laminate body)

(10) Antiferromagnetic Layer 50—PtAuMn Protective Layer 80—Rh/Ru (laminate body)

In the present invention, the concentration of oxygen contained in the antiferromagnetic layer 50 is regulated to 1 to 2,000 atomic ppm, preferably 1 to 1,000 atomic ppm, and more preferably 1 to 600 atomic ppm. If this value exceeds 2,000 atomic ppm, there is raised a disadvantage that a large value of energy Jk of exchange coupling between the antiferromagnetic layer 50 and the ferromagnetic layer 40 can not be obtained. Further, dispersion of the blocking temperatures Tb increases so that a thin film excellent in pinning effect can not be obtained. It is preferable that the lower limit of the oxygen concentration is as close to zero as possible. However, since it is practically impossible to realize zero, 1 atomic ppm is regulated as a general standard of the lower limit.

The exchange coupling energy Jk between the antiferromagnetic layer and the ferromagnetic layer as one of characteristic evaluation items in the present invention is defined by Jk=Ms.Hua.d, wherein Ms represents a saturation magnetization of the ferromagnetic layer, Hua represents a shift magnetic field due to exchange coupling, and d represents a thickness of the ferromagnetic layer. Assuming that the ferromagnetic layers to be pinned are made of the same material and have the same thickness, the shift magnetic field Hua increases as a value of Jk increases so that an operation of the MR head becomes stable. For using as an MR head for recording density exceeding 10 Gbit/inch$^2$, a value of Jk needs to be no less than about 0.08 erg/cm$^2$. If this value becomes less than 0.08 erg/cm$^2$, the shift magnetic field is reduced. Thus, it is possible that the pinning effect with stable spins relative to the ferromagnetic layer 40 is lost so that the stable operation as the spin valve is not revealed.

In the present invention, the antiferromagnetic layer 50 further contains carbon, sulfur and chlorine as impurities. The concentration of carbon contained in the antiferromagnetic layer 50 is set to 1 to 2,000 atomic ppm, the concentration of sulfur to 1 to 1,000 atomic ppm, and the concentration of chlorine to 1 to 2,000 atomic ppm. If the upper limits of those impurity concentration ranges are exceeded, there is raised a disadvantage that a large value of energy Jk of exchange coupling between the antiferromagnetic layer and the ferromagnetic layer can not be obtained. Further, dispersion of the blocking temperatures Tb increases so that a thin film excellent in pinning effect can not be obtained. It is preferable that the lower limits of those impurity concentrations are as close to zero as possible. However, since it is practically impossible to realize zero, 1 atomic ppm is regulated as a general standard of the lower limit.

The thickness of the antiferromagnetic layer 50 is set to 5 to 100 nm, preferably 5 to 80 nm, more preferably 5 to 50 nm, still more preferably 5 to 30 nm. If the thickness of the antiferromagnetic layer 50 becomes smaller than 5 nm, the exchange coupling magnetic field Hua and the blocking temperature Tb are rapidly reduced. On the other hand, in case of being thicker, it is not so serious. However, if it is too thick, a gap length (a shield-shield length) of the MR head is so increased that it is not suitable for the ultrahigh density magnetic recording. Thus, it is preferably less than 100 nm.

The ferromagnetic layer 40 is formed of a metal element such as Fe, Ni, Co, Mn, Cr, Dy, Er, Nd, Tb, Tm, Ce, Gd, alloy or compound containing the above metal element. Particularly, it is preferably formed of a composition expressed by $(Co_zNi_{1-z})_wFe_{1-w}$ ($0.4 \leq z \leq 1.0$, $0.5 \leq w \leq 1.0$ by weight). Out of the composition range as described above, no large electrical resistance change can be obtained. The thickness of the ferromagnetic layer 40 as described above is set to 1.6 to 10 nm, and more preferably 2 to 6 nm. If this value is smaller than 1.6 nm, it loses the characteristic as the ferromagnetic layer. On the other hand, if the value exceeds 10 nm, the pinning force of the antiferromagnetic layer 50 is reduced, and thus the sufficient pinning effect of the spin of the ferromagnetic layer can not be obtained.

As described above, since the ferromagnetic layer 40 is in direct abutment with the antiferromagnetic layer 50, a direct interlayer interaction acts on each other so that the rotation of the magnetization of the ferromagnetic layer 40 is prevented. On the other hand, with respect to the soft magnetic layer 20 as described later in detail, its magnetization can be freely rotated by a signal magnetic field from outside. As a result, a relative angle is produced in magnetization between the soft magnetic layer 20 and the ferromagnetic layer 40, so that a large MR effect due to the difference between the magnetization directions can be obtained.

The soft magnetic layer 20 is formed of Fe, Ni, Co or the like revealing soft magnetic characteristics, or alloy or compound containing these elements. The MR curve rises up more sharply by using the magnetic layer having a small coercive force Hc, and a favorable effect can be obtained. It is particularly preferable that the soft magnetic layer 20 has the following two-layer structure. Specifically, the soft magnetic layer 20 is formed as a two-layer laminate body comprising, from the side of the non-magnetic layer 30, a first soft magnetic layer and a second soft magnetic layer. The first soft magnetic layer is made of a simple substance of Co (cobalt) or an alloy containing Co no less than 80 weight %. The second soft magnetic layer has a composition expressed by $(Ni_xFe_{1-x})_yCo_{1-y}$ ($0.7 \leq x \leq 0.9$, $0.5 \leq y \leq 1.0$ by weight). With this arrangement, the first soft magnetic layer with Co being rich works as a diffusion blocking layer so as to prevent diffusion of Ni from the side of the second soft magnetic layer toward the non-magnetic metal layer 30. Further, since the first soft magnetic layer with Co being rich enhances the scattering of electrons, the MR ratio is improved. The second soft magnetic layer is formed within the foregoing composition range for maintaining the soft magnetic characteristic.

The thickness of the soft magnetic layer 20 as described above is set to 2 to 15 nm, preferably 3 to 15 nm, and more preferably 5 to 15 nm. If this value is smaller than 2 nm, no excellent characteristic as the soft magnetic layer can be obtained. On the other hand, if the value exceeds 15 nm, the total thickness of the multilayered film is large and the resistance of the whole magnetic multilayered film is increased, so that the MR effect is reduced. When the soft magnetic layer 20 is in the form of the foregoing two-layer laminate body, it is sufficient to set the thickness of the Co-rich first soft magnetic layer to be no less than 0.4 nm.

In order to conduct electrons efficiently, a metal having conductivity is preferably used for the non-magnetic metal layer which is interposed between the soft magnetic layer 20 and the ferromagnetic layer 40. More specifically, it may be formed of at least one selected from Au, Ag and Cu, alloy containing 60 weight % or more of at least one of these elements, or the like.

The thickness of the non-magnetic metal layer 30 is preferably set to 1.5 to 4 nm. If this value is smaller than 1.5 nm, the soft magnetic layer 20 and the ferromagnetic layer 40 which are disposed through the non-magnetic metal layer are exchange-coupled to each other, so that the spins of the soft magnetic layer 20 and the ferromagnetic layer 40 do not function independently of each other. If this value exceeds 4 nm, the rate of the electrons which are scattered at the interface between the soft magnetic layer 20 and the ferromagnetic layer 40 disposed at the upper and lower sides respectively is reduced, so that the MR ratio is reduced.

The substrate 5 is formed of glass, silicon, MgO, GaAs, ferrite, AlTiC, CaTiO$_3$ or the like, and the thickness thereof is generally set to about 0.5 to 10 mm.

The material of each layer and the thickness thereof are specified as described above, and an external magnetic field is applied in a direction within the film surface as described later at the film formation time of at least the soft magnetic layer 20 to apply anisotropic magnetic field Hk of 2 to 20 Oe, preferably 2 to 16 Oe, and more preferably 2 to 10 Oe.

If the anisotropic magnetic field Hk of the soft magnetic layer is lower than 2 Oe, it is equal to the same degree of the coercive force, and no linear MR change curve can be substantially obtained in the vicinity of zero magnetic field, so that the characteristic as the MR element is deteriorated. On the other hand, if it is higher than 20 Oe, when this film is applied to the MR head or the like, the output is liable to be reduced and the resolution is reduced. The value Hk as described above can be obtained by applying the external magnetic field of 10 to 300 Oe at the film formation. If the external magnetic field is no greater than 10 Oe, it is too insufficient to induce Hk. On the other hand, if it exceeds 3000 Oe, the effect is not improved although a coil must be designed in large size due to an occurrence of magnetic field. Therefore, the cost is increased and thus it is inefficient.

The magnetic multilayered film 1 may be repetitively laminated to form a magnetoresistance effect film. In this case, the repetitive lamination frequency n of the magnetic multilayered film is not limited to a specific value, and it may be suitably selected in accordance with a desired magnetoresistance ratio, etc. In order to satisfy the present requirement for ultrahigh densification of the magnetic recording, the smaller total film thickness of the magnetic multilayered film is better. However, if the film is thinner, the MR effect is usually reduced. The magnetic multilayered film of this invention can be used in practice to a sufficient level, even when the repetitive lamination frequency n is 1. Furthermore, as the lamination frequency is increased, the magnetoresistance ratio increases while productivity is lowered. If n is excessively large, the resistance of the whole element is excessively low, and it is practically inconvenient. Therefore, usually, n is preferably set to 10 or less. The preferable range of n is 1 to 5.

The film formation of each layer of the foregoing magnetic multilayered film 1 is carried out by sputtering. Upon formation of the magnetic multilayered film 1, particularly, upon formation of the antiferromagnetic layer 50, an ultimate pressure in a vacuum film forming apparatus is set to $2\times10^{-9}$ Torr or less, preferably $8\times10^{-10}$ Torr or less, and more preferably $2\times10^{-10}$ Torr or less. The ultimate pressure is defined as a pressure in the film forming apparatus before the start of film formation, and differs from a pressure upon film formation.

If the value of the ultimate pressure exceeds $2\times10^{-9}$ Torr, the antiferromagnetic layer 50 having the desired characteristic of the present invention can not be formed.

The range of the ultimate pressure of no more than $2\times10^{-9}$ Torr is a range which has not been proposed in view of improving the film quality. For accomplishing the condition of the ultimate pressure of no more than $2\times10^{-9}$ Torr, what is not carried out in general is required with respect to a sputtering apparatus. Specifically, it is necessary that vacuum seal portions be all metal gaskets, that the apparatus be all formed of stainless steel or aluminum, that degassing be carried out at high temperature under vacuum upon assembling the apparatus, that, during exhaust, the whole vacuum vessel be baked to high temperatures so as to thoroughly and forcibly discharge residual gas and $H_2O$, and that an exhaust pump operable under $2\times10^{-9}$ Torr or less be used.

For forming the antiferromagnetic layer 50, the concentration of oxygen contained in a target used in the sputtering is set to 1 to 600 ppm, preferably 1 to 500 ppm, and more preferably 1 to 300 ppm. If the concentration of oxygen contained in the target exceeds the foregoing range, it is difficult to form the antiferromagnetic layer 50 having the desired characteristic of the present invention. The oxygen concentration of the target is derived through analysis using the amount of $CO_2$ gas produced by burning a portion of the target. Further, the total concentration of impurities (for example, $H_2O$, $CO_2$ and He) in the sputtering gas introduced upon sputtering is set to 0.1 to 100 ppb, preferably 0.1 to 50 ppb, more preferably 0.1 to 10 ppb, and still more preferably 0.1 to 5 ppb. If the concentration of impurities in the sputtering gas exceeds 100 ppb, the antiferromagnetic layer 50 having the desired characteristic of the present invention can not be formed. Particularly, the $H_2O$ impurity concentration in the sputtering gas is liable to influence the film quality and is required to be set to no more than 40 ppb, preferably no more than 10 ppb, and more preferably no more than 5 ppb.

An operating pressure in the vacuum film forming apparatus during actual film formation is normally set to $1\times10^{-4}$ to $1\times10^{-2}$ Torr.

It is preferable that the film formation of the respective layers of the magnetic multilayered film 1 in the present invention is carried out according to the foregoing film forming conditions for further improving the characteristic of the magnetoresistance effect film.

As the substrate 5, glass, silicon, MgO, GaAs, ferrite, AlTiC, $CaTiO_3$ or the like may be used. For the film formation, it is preferable that an external magnetic field of 10 to 300 Oe is applied in one direction within the film plane at the film formation of the soft magnetic layer 20. With this operation, the anisotropic magnetic field Hk can be provided to the soft magnetic layer 20. The application of the external magnetic field may be performed at only the film formation time of the soft magnetic field, for example, using a device which is equipped with an electromagnet or the like which is capable of easily controlling an application timing of the magnetic field, and no external magnetic field is applied at the film formation time of the antiferromagnetic layer 50. Alternatively, a method of applying a constant magnetic field at the film formation time at all times may be used.

As described above, by applying the external magnetic field in one direction within the film plane at least upon film formation of the soft magnetic layer 20 to induce the anisotropic magnetic field Hk, the high frequency characteristic can be further improved.

Furthermore, when forming the antiferromagnetic layer 50, the magnetic field is preferably applied in a direction perpendicular to the direction of the magnetic field applied at the film formation time of the soft magnetic film 20. Specifically, it is applied within the film plane of the magnetic multilayered film and in a direction orthogonal to the measurement current. The magnitude of the applied magnetic field is preferably set in the range of 10 to 300 Oe. Through this, the magnetization direction of the ferromagnetic layer 40 is surely fixed in the applied magnetic field direction (direction perpendicular to the measurement current) by the antiferromagnetic layer 50, whereby the magnetization of the ferromagnetic layer can be most reasonably set to be antiparallel to the magnetization of the soft magnetic layer 20 whose direction can be freely changed by the signal magnetic field. However, this is not a necessary condition, and the direction of the magnetic field to be applied at the film formation time of the antiferromagnetic layer may be coincident with the direction of the magnetization of the magnetic field to be applied at the film formation time of the soft magnetic layer. At this time, it is preferable that the temperature is decreased while applying the magnetic field in a strip short-side direction (direction perpendicular to the direction of the applied magnetic field when the soft magnetic layer 20 is formed), when the heat treatment at 150 to 300° C., particularly about 200° C., is carried out in the process after the magnetic multilayered film is formed.

The magnetoresistance effect film 3 having the magnetic multilayered film 1 as described in the foregoing carrying-out mode is applied to a magnetoresistance effect type head (MR head), an MR sensor, a ferromagnetic memory element, an angle sensor or the like.

Hereinbelow, explanation will be given to an example where the magnetoresistance effect film 3 is applied to the magnetoresistance effect type head. As the magnetoresistance effect type head in the present invention, a spin valve head having a magnetic multilayered film revealing the giant magnetoresistance effect (GMR) may be cited as a preferred example.

Hereinbelow, the spin valve head will be picked up as the magnetoresistance effect type head (MR head) and given explanation.

Figure 4:
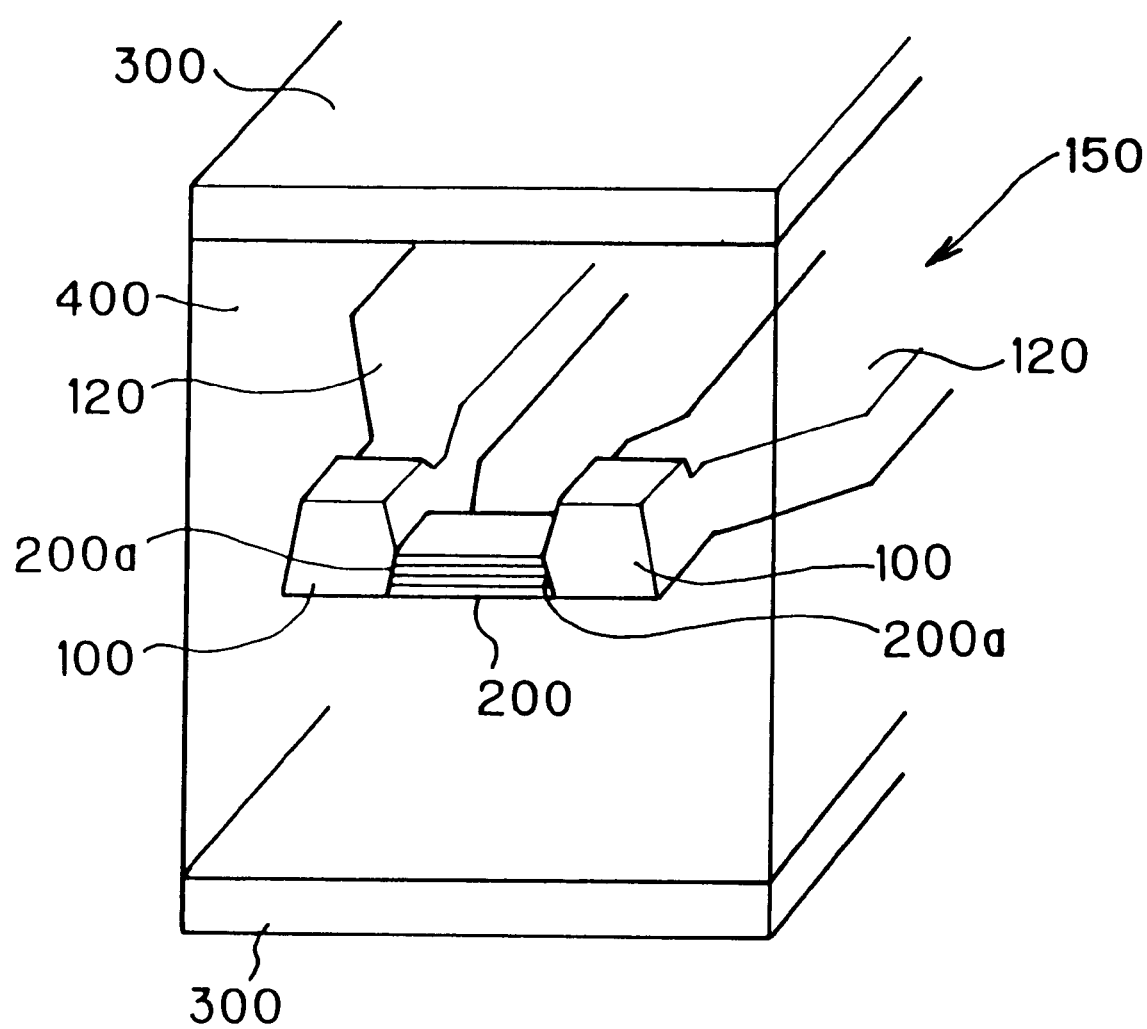
FIG. 4 is a schematic perspective view showing an example of a magnetoresistance effect type head according to the present invention.

As shown in FIG. 4, a magnetoresistance effect type head (MR head) 150 includes a magnetoresistance effect film 200 serving as a magnetically-sensitive portion for magnetically sensing a signal magnetic field, and electrode portions 100, 100 which are formed at both end portions 200a, 200a of the magnetoresistance effect film 200. Preferably, the whole both end portions 200a, 200a of the magnetoresistance effect film 200 serving as the magnetically-sensitive portion are connected to the electrode portions 100, 100. Conductive films 120, 120 are electrically conducted to the magnetoresistance effect film 200 through the electrode portions 100, 100. In this invention, the conductive film 120 and the electrode portion 100 are individually shown to simplify the description which will be made later, while in most cases the conductive film 120 and the electrode portion 100 are formed integral with each other by a thin film forming method. Accordingly, these elements may be considered as being formed of one member.

The magnetoresistance effect film 200 serving as the magnetically-sensitive portion of the MR head has substantially the same laminate structure as the magnetoresistance effect film 3 having the magnetic multilayered film 1 shown in FIG. 1. That is, the magnetoresistance effect film 200 is substantially replaced by the magnetoresistance effect film 3 having the magnetic multilayered film shown in FIG. 1, so that the magnetoresistance effect film 200 includes a non-magnetic metal layer 30, a ferromagnetic layer 40 formed on one surface of the non-magnetic metal layer 30, a soft magnetic layer 20 formed on the other surface of the non-magnetic metal layer 30, an antiferromagnetic layer 50 which is formed on a surface of the ferromagnetic layer 40 remote from the other surface thereof abutting the non-magnetic metal layer 30 so as to pin the direction of magnetization of the ferromagnetic layer 40, and a protective layer 80 which is formed on a surface of the antiferromagnetic layer 50 remote from the other surface thereof abutting the ferromagnetic layer 40.

The important point is that the thus formed magnetoresistance effect film 200 exhibits the so-called spin-valve type magnetoresistance change. The spin-valve type magnetoresistance change represents that, in the magnetic multilayered film having the non-magnetic metal layer 30, the ferromagnetic layer 40 formed on one surface of the non-magnetic metal layer 30, the soft magnetic layer 20 formed on the other surface of the non-magnetic metal layer 30 and the antiferromagnetic layer 50 formed on the ferromagnetic layer for pinning the magnetization direction of the ferromagnetic layer 40, an angle formed between the spin of the soft magnetic layer 20 and the spin of the pinned ferromagnetic layer 40 is set to approximately 90 degrees in an acute angle when the external signal magnetic field is zero. In practice, the angle may be 45 to 90 degrees, and most preferably 90 degrees (orthogonalization of magnetization) for causing the magnetoresistance effect curve (MR curve) to be asymmetrical relative to the plus and minus external magnetic fields with respect to the zero external magnetic field.

For achieving the orthogonalization of magnetization, it is necessary that the magnetic multilayered film 1 is subjected to a vacuum heat treatment at no less than the blocking temperature Tb of the antiferromagnetic layer 50 in the magnetic field. This treatment is called an orthogonalization heat treatment, and a temperature during the treatment is called an orthogonalization temperature. It is also possible to provide the orthogonalization of magnetization in advance by applying the magnetic field during the film formation. However, in this case, the orthogonalization state may be disturbed by the unavoidable heat applied during the subsequent head fabricating process. Thus, it is preferable to carry out the orthogonalization heat treatment at the final stage of the head fabricating process. In the orthogonalization heat treatment, it is preferable to change only the magnetization direction of the antiferromagnetic layer 50. Preferably, the orthogonalization temperature is higher than the blocking temperature Tb and lower than a temperature at which the induced magnetic anisotropy of the soft magnetic layer 20 is lost. If the orthogonalization heat treatment is carried out when the blocking temperature Tb is higher than the temperature at which the induced magnetic anisotropy of the soft magnetic layer 20 is lost, the magnetization direction of the soft magnetic layer 20 is oriented in a magnetization easy axis direction relative to the external magnetic field so that the magnetoresistance effect curve relative to the external magnetic field is subjected to hysteresis to cause a problem in linearity. Simultaneously, the output is lowered. On the other hand, when the blocking temperature Tb is too lower than the temperature at which the induced magnetic anisotropy of the soft magnetic layer 20 is lost, the exchange coupling magnetic field Hua is deteriorated due to heat applied during operation of an MR sensor in the magnetic recording system and during the spin valve head fabricating process so that the magnetic multilayered film can not work as a spin valve film. That is, it is preferable to form the antiferromagnetic layer 50 having the blocking temperature Tb which is a little lower than the temperature at which the induced magnetic anisotropy of the soft magnetic layer 20 is lost, and carry out the orthogonalization heat treatment. In the present invention, by setting a composition of the antiferromagnetic layer 50 within the foregoing range, the blocking temperature Tb is selectable in the range of 160 to 400° C. The orthogonalization heat treatment is performed in the range of about 150 to 410° C. Particularly, in the present invention, since the material of the protective layer 80 is selected in relation to the composition of the antiferromagnetic layer 50, deterioration of the characteristic as the spin valve film is quite small, for example, even after having been subjected to the heat treatment at 210 to 250° C. over two hours or so.

As shown in FIG. 4, in the magnetoresistance effect type head (MR head) 150, shield layers 300, 300 are formed so as to sandwich the magnetoresistance effect film 200 and the electrode portions 100, 100 at the upper and lower sides, and a non-magnetic insulation layer 400 is formed at a portion between the magnetoresistance effect film 200 and the shield layers 300, 300.

The same materials and thicknesses as described in the foregoing carrying-out mode of the magnetic multilayered film are preferably used for the ferromagnetic layer 40, the non-magnetic metal layer 30, the soft magnetic layer 20, the antiferromagnetic layer 50 and the protective layer 80 used in the magnetoresistance effect film 200 as the magnetically-sensitive portion.

As shown in FIG. 4, the current-flowing electrode portions 100 are arranged so that both end portions 200a, 200a of the magnetoresistance effect film 200 are wholly contacted with the electrode portions 100 in the laminate direction of the magnetoresistance effect film 200. Then, the electrons intensively flow through the portion sandwiched between the soft magnetic layer 20 and the ferromagnetic layer 40. At this time, the electrons are magnetically scattered in accordance with the spin directions of the soft magnetic layer 20 and the ferromagnetic layer 40, so that the resistance is greatly varied. Accordingly, a fine change of the external magnetic field can be detected as a large change of electrical resistance.

Figure 5:
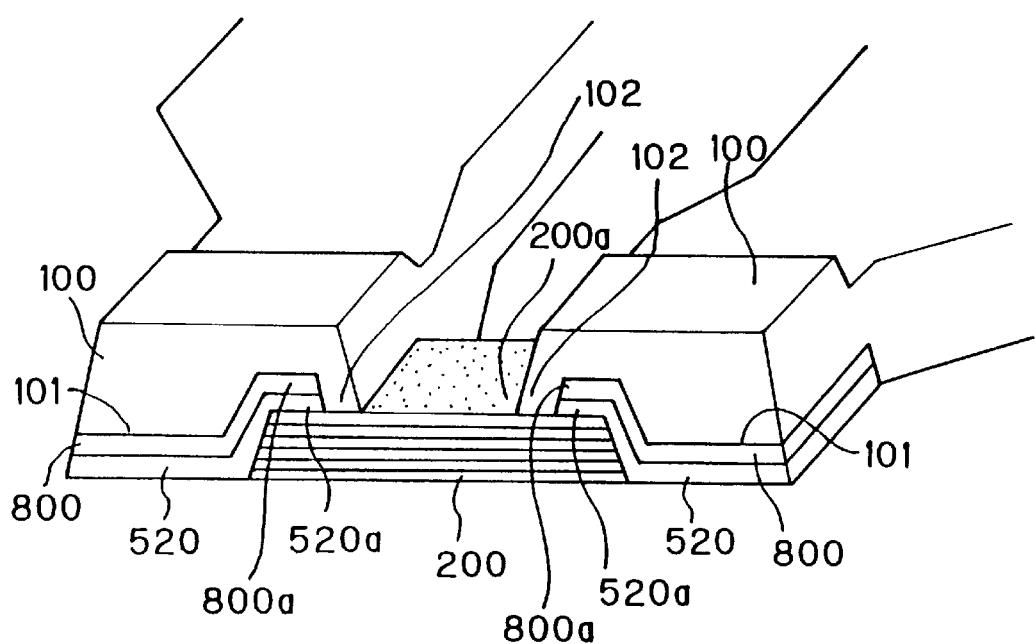
FIG. 5 is a schematic perspective view showing a preferred connection state between a magnetoresistance effect film and electrode portions of a magnetoresistance effect type head according to the present invention.

It is particularly preferable that the MR head having the spin valve film of the present invention has a head structure as shown in FIG. 5. Specifically, between the magnetoresistance effect film 200 working as a magnetically-sensitive portion and the electrode portions 100 for conducting the measurement current, linking soft magnetic layers 520 and antiferromagnetic layers 800 (or hard magnetic layer 800) are interposed in order from the side of the magnetoresistance effect film 200 as shown in the drawing. Further, the linking soft magnetic layer 520 and the antiferromagnetic layer 800 (or hard magnetic layer 800) are formed such that their one end side covers a portion of an upper side 200a (near the soft magnetic layer) of the magnetoresistance effect film 200 and their other end side gets under a lower surface 101 of the electrode portion 100 as shown in the drawing. Further, an end portion 102, located at the head center side, of the electrode portion 100 is formed so as to cover a portion of the upper side 200a (near the soft magnetic layer) of the magnetoresistance effect film 200 and also cover upper end portions 520a, 800a of the linking soft magnetic layer 520 and the antiferromagnetic layer 800, respectively. The linking soft magnetic layer 520 is about 10 nm in thickness and made of, for example, NiFe, NiFeCr, NiFeRh, NiFeRu, CoZrNb, FeAlSi and FeZrN. The antiferromagnetic layer 800 is about 50 nm in thickness and made of, for example, $Ru_5Rh_{15}Mn$, NiMn, FeMn, PtMn and $\alpha\text{-}Fe_2O_3$. The hard magnetic layer 800 is about 50 nm in thickness and made of, for example, CoPt and CoPtCr.

With such an arrangement, through effects of both the linking soft magnetic layers 520 and the antiferromagnetic layers 800 formed at the magnetoresistance effect film 200, the longitudinal bias can be given quite efficiently so that the MR head which can suppress the Barkhausen noises can be achieved. Further, since the end portions 102 of the electrode portions 100 are formed so as to cover the magnetoresistance effect film 200, the MR head can be provided wherein the signal magnetic field is not lowered at the end portions of the element, and further, the formation of narrow track width, such as no greater than 1 $\mu$m, is easy.

When these MR heads are manufactured, heat treatments such as baking, annealing, resist curing, etc. are indispensable for a patterning process, a flattening process, etc. in the manufacturing process.

In general, a problem of heat-resistance frequently occurs in the magnetoresistance effect film having the foregoing magnetic multilayered film due to the thickness of each layer. According to the magnetoresistance effect film (magnetic multilayered film) of the present invention, the magnetic field is applied to provide anisotropic magnetic field in the magnetic layer, so that, after the film formation, it can endure a heat treatment at a temperature 300° C. or less, generally 100 to 300° C. for about one hour. The heat treatment is generally performed under vacuum, inert gas atmosphere, or atmospheric air. Particularly, if the heat treatment is conducted under a vacuum (pressure-reduced) state at $10^{-7}$ Torr or less, a magnetoresistance effect film (magnetic multilayered film) whose characteristic is extremely less deteriorated can be obtained. Furthermore, the MR characteristic is little deteriorated even by lapping or polishing in the processing step.

The protective layer in the present invention can also be used as a general protective layer, excluding a positional relationship to the antiferromagnetic layer 50.

The invention of the foregoing magnetoresistance effect film and the invention of the magnetoresistance effect type head using such a magnetoresistance effect film will be explained in further detail based on the following concrete examples.

[Example I]

(Preparation of Inventive Sample I-1)

A sample of a magnetoresistance effect film (Inventive Sample I-1) was prepared by stacking, on a glass substrate 5, an under layer (Ta; 5 nm in thickness), a ferromagnetic layer 40 (Co; 5 nm in thickness), an antiferromagnetic layer 50 ($Ru_3Rh_{15}Mn_{82}$; 10 nm in thickness) as a pinning layer, and a protective layer 80 (Rh; 5 nm in thickness) in the order named.

The sample was formed by a sputtering method, wherein an induction field was applied in a fixed direction upon the formation thereof. The sputtering condition was such that the ultimate pressure in a vacuum film forming apparatus was set to $8\times10^{-10}$ Torr, the oxygen concentration of a target was set to 200 to 500 ppm, and the impurity concentration in the sputtering gas was set to 30 ppb where the $H_2O$ concentration was set to 8 ppb.

An experiment was carried out with respect to the sample for examining an influence of an annealing process (heat treatment) at 250° C. for two hours onto a magnetic characteristic of a magnetoresistance effect film. Specifically, values of the exchange coupling energy Jk and the saturation magnetization Ms were measured (1) upon the film formation (as depo) and (2) after the annealing process (heat treatment) at 250° C. for two hours, so as to derive variations (%) thereof before and after the annealing process (heat treatment).

Figure 6:
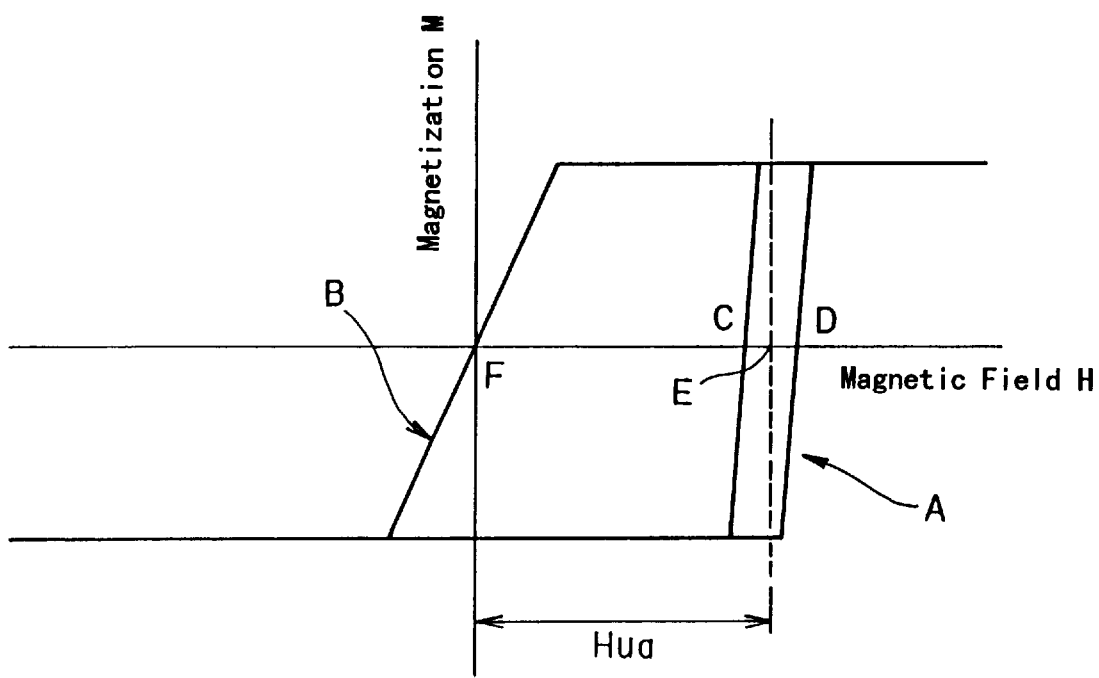
FIG. 6 is a diagram showing an M-H loop according to the present invention.

Magnetization curves were described in a magnetic field of 1 KOe using a vibration sample type magnetometer (VSM), then the exchange coupling magnetic field Hua and the saturation magnetization Ms of the ferromagnetic layer 40 were derived from such magnetization curves, and then the exchange coupling energy Jk was derived using those values. The exchange coupling magnetic field Hua is defined as a magnetic field, for example, at point E (middle point between point C and point D) shifting from the origin F in the magnetization curves as shown in FIG. 6. In the drawing, a magnetization curve A shows a magnetization easy axis direction (direction in which the magnetic field was applied upon film formation), and a magnetization curve B shows a magnetization hard axis direction. (Preparation of Inventive Samples I-2 to I-4) Inventive Samples I-2, I-3 and I-4 were prepared in the same manner as Inventive Sample I-1, only changing the material of the protective layer 80 used in Inventive Sample I-1 from Rh to Ru, Zr and Ti, respectively.

(Preparation of Comparative Sample I-1)

Comparative Sample I-1 was prepared in the same manner as Inventive Sample I-1, only changing the material of the protective layer 80 used in Inventive Sample I-1 from Rh to Ta.

(Preparation of Comparative Sample I-2)

Comparative Sample I-2 was prepared in the same manner as Inventive Sample I-1, only changing the material and thickness of the protective layer 80 used in Inventive Sample I-1 from Rh (thickness: 5 nm) to Hf (thickness: 6 nm).

(Preparation of Comparative Sample I-3)

Comparative Sample I-3 was prepared in the same manner as Inventive Sample I-1, only changing the material and thickness of the protective layer 80 used in Inventive Sample I-1 from Rh (thickness: 5 nm) to a laminate body of Ta (thickness: 5 nm) and Rh (thickness: 5 nm) wherein Ta is in direct abutment with the antiferromagnetic layer 50.

(Preparation of Comparative Sample I-4)

Comparative Sample I-4 was prepared in the same manner as Inventive Sample I-1, only changing the material and thickness of the protective layer 80 used in Inventive Sample I-1 from Rh (thickness: 5 nm) to a laminate body of Ta (thickness: 5 nm) and Ru (thickness: 5 nm) wherein Ta is in direct abutment with the antiferromagnetic layer 50.

Values of the exchange coupling energy Jk and the saturation magnetization Ms measured with respect to the foregoing samples (1) upon the film formation (as depo) and (2) after the annealing process (heat treatment) at 250° C. for two hours, as well as variations (%) thereof before and after the annealing process (heat treatment) are shown in Table 1 below.

The reason is considered that Rh and Ru are very strong against oxidation, and further that Rh and Ru provide a high barrier effect against mutual diffusion in relation to an Mn alloy contained in the antiferromagnetic layer 50.

In each of the samples of Example I, the concentration of impurities contained in the antiferromagnetic layer was such that the oxygen concentration was 200 to 400 ppm, the carbon concentration was 80 to 200 ppm, the sulfur concentration was 80 to 300 ppm and the chlorine concentration was 50 to 100 ppm. The measurement of the concentration of impurities contained in the antiferromagnetic layer was carried out according to the following method.

Measuring Method of Concentration of Impurities contained in Antiferromagnetic Layer Evaluation should be carried out relative to an antiferromagnetic layer having a thickness used in an actual head, which, however, exceeds the limit of analysis. Accordingly, an antiferromagnetic layer having a thickness of about 1 to 3 μm is formed under the same film forming condition and using the same film forming apparatus as those for forming an actual magnetoresistance effect film. In this case, for preventing influence from a side of the substrate, a proper

TABLE 1

| Sample No. | Protective layer | | as depo | | after annealing | | Variation(%) | |
|---|---|---|---|---|---|---|---|---|
| | Material | Thickness (nm) | Jk (erg/cm$^2$) | Ms (emu/cm$^3$) | Jk (erg/cm$^2$) | Ms (emu/cm$^3$) | Jk (%) | Ms (%) |
| Inventive example I-1 | Rh | 5 | 0.115 | $5.94 \times 10^{-4}$ | 0.098 | $5.05 \times 10^{-4}$ | −14.6 | −15.0 |
| Inventive example I-2 | Ru | 5 | 0.112 | $5.89 \times 10^{-4}$ | 0.095 | $4.99 \times 10^{-4}$ | −15.2 | −15.3 |
| Inventive example I-3 | Zr | 5 | 0.111 | $5.88 \times 10^{-4}$ | 0.089 | $4.82 \times 10^{-4}$ | −20.1 | −18.0 |
| Inventive example I-4 | Ti | 5 | 0.113 | $5.84 \times 10^{-4}$ | 0.089 | $4.74 \times 10^{-4}$ | −20.9 | −18.8 |
| Comparative example I-1 | Ta | 5 | 0.110 | $5.81 \times 10^{-4}$ | 0.074 | $4.53 \times 10^{-4}$ | −33.0 | −32.1 |
| Comparative example I-2 | Hf | 6 | 0.109 | $5.78 \times 10^{-4}$ | 0.075 | $3.87 \times 10^{-4}$ | −31.0 | −33.0 |
| Comparative example I-3 | Ta/Rh | 5/5 | 0.110 | $5.83 \times 10^{-4}$ | 0.078 | $4.16 \times 10^{-4}$ | −29.0 | −28.5 |
| Comparative example I-4 | Ta/Ru | 5/5 | 0.110 | $5.82 \times 10^{-4}$ | 0.076 | $4.04 \times 10^{-4}$ | −31.0 | −30.6 |

From the results shown in Table 1, the variation of Ms before and after the annealing process (heat treatment) is quite large, i.e. about 32 to 33%, with respect to the conventional protective layer made of Ta or Hf. On the other hand, with respect to the protective layer of the present invention, the variation of Ms before and after the annealing process is suppressed to be very small, i.e. about 15 to 18%. Particularly, in case of the protective layer being made of Rh or Ru, it can be seen that an excellent effect is revealed wherein the variation is about 15%. Further, in case of the conventional protective layer being made of Ta or Hf, the variation of Jk before and after the annealing process (heat treatment) is quite large, i.e. about 29 to 31%. On the other hand, in case of the protective layer of the present invention, the variation of Jk before and after the annealing process (heat treatment) is suppressed to be very small, i.e. about 14 to 20%. Particularly, in case of the protective layer being made of Rh or Ru, it can be seen that an excellent effect is revealed wherein the variation is about 15%.

buffer layer of metal is provided and, for preventing oxidation, a protective layer of other meal is provided as a top layer. Thereafter, quantitative analysis is carried out using a secondary ion mass spectroscopy (SIMS).

[Example II]

From the foregoing experimental results, attention was paid to Rh having the most excellent function as the protective layer. Various samples were prepared as shown in Table 2 below, wherein protective layers were made of Rh while compositions of antiferromagnetic layers were variously changed. The samples were prepared substantially in the same manner as in Example I. Evaluation similar to that in Example I was performed with respect to the prepared samples. The results are shown in Table 2.

TABLE 2

| Sample No. | Antiferromagnetic layer | as depo Jk (erg/cm$^2$) | as depo Ms (emu/cm$^3$) | after annealing Jk (erg/cm$^2$) | after annealing Ms (emu/cm$^3$) | Variation(%) Jk (%) | Variation(%) Ms (%) |
|---|---|---|---|---|---|---|---|
| Inventive example I-1 | $Ru_3Rh_{15}Mn_{82}$ | 0.115 | $5.94 \times 10^{-4}$ | 0.098 | $5.05 \times 10^{-4}$ | −14.6 | −15.0 |
| Inventive example II-1 | $Ru_1Rh_{21}Mn_{78}$ | 0.152 | $5.91 \times 10^{-4}$ | 0.133 | $5.17 \times 10^{-4}$ | −12.3 | −12.6 |
| Inventive example II-2 | $Ru_2Rh_{20}Mn_{78}$ | 0.138 | $5.96 \times 10^{-4}$ | 0.120 | $5.18 \times 10^{-4}$ | −12.8 | −13.1 |
| Inventive example II-3 | $Ru_4Pt_{15}Mn_{81}$ | 0.135 | $5.92 \times 10^{-4}$ | 0.115 | $5.04 \times 10^{-4}$ | −14.8 | −14.9 |
| Inventive example II-4 | $Ru_6Pt_{14}Mn_{80}$ | 0.131 | $5.81 \times 10^{-4}$ | 0.110 | $4.85 \times 10^{-4}$ | −16.2 | −16.6 |
| Inventive example II-5 | $Ru_6Pt_{45}Mn_{49}$ | 0.312 | $5.23 \times 10^{-4}$ | 0.293 | $4.92 \times 10^{-4}$ | −6.2 | −6.0 |
| Inventive example II-6 | $Ru_4Ni_{47}Mn_{49}$ | 0.263 | $4.93 \times 10^{-4}$ | 0.222 | $4.15 \times 10^{-4}$ | −15.6 | −15.9 |
| Inventive example II-7 | $Ru_2Ni_{50}Mn_{48}$ | 0.286 | $4.99 \times 10^{-4}$ | 0.259 | $4.47 \times 10^{-4}$ | −9.6 | −10.5 |
| Inventive example II-8 | $Ru_{10}Pt_{39}Mn_{51}$ | 0.261 | $5.16 \times 10^{-4}$ | 0.218 | $4.29 \times 10^{-4}$ | −16.3 | −16.8 |
| Inventive example II-9 | $Ru_9Rh_{12}Mn_{79}$ | 0.101 | $5.85 \times 10^{-4}$ | 0.083 | $4.80 \times 10^{-4}$ | −17.4 | −18.0 |
| Inventive example II-10 | $Pt_{51}Mn_{49}$ | 0.325 | $5.19 \times 10^{-4}$ | 0.260 | $4.11 \times 10^{-4}$ | −20.1 | −20.9 |
| Inventive example II-11 | $Ru_{16}Mn_{84}$ | 0.103 | $5.81 \times 10^{-4}$ | 0.083 | $4.70 \times 10^{-4}$ | −19.6 | −19.1 |
| Inventive example II-12 | $Ru_{30}Mn_{70}$ | 0.096 | $5.76 \times 10^{-4}$ | 0.075 | $4.52 \times 10^{-4}$ | −21.9 | −21.6 |

From the results shown in Table 2, it is seen that in case of the material of the protective layer being Rh, the excellent results can be obtained in the combination with the antiferromagnetic layers containing Mn no less than 40 at %. Among them, the highly excellent results can be obtained in the combination with the antiferromagnetic layer made of RuRhMn, RuPtMn or RuNiMn which contains Mn and Ru.

[Example III]

(Preparation of Inventive Sample III-1)

A spin valve (SV) type magnetoresistance effect film being a main part of a spin valve type magnetoresistance effect type head was prepared in the following manner. Specifically, a sample (Inventive Sample III-1) of the spin valve type magnetoresistance effect film was prepared by stacking, on a substrate 5 (AlTiC with $Al_2O_3$), an under layer 7 (Ta; 5 nm in thickness), a soft magnetic layer 20 (NiFe; 9 nm in thickness/Co; 1 nm in thickness), a non-magnetic metal layer 30 (Cu; 2.5 nm in thickness), a ferromagnetic layer 40 (Co; 2 nm in thickness), an antiferromagnetic layer 50 ($Ru_4Rh_{14}Mn_{82}$; 10 nm in thickness) and a protective layer 80 (Rh; 5 nm in thickness) in the order named.

The impurity concentration of the antiferromagnetic layer 50 was such that the oxygen concentration: 200 to 400 ppm, the carbon concentration: 80 to 200 ppm, the sulfur concentration: 80 to 300 ppm and the chlorine concentration: 50 to 100 ppm.

An experiment was carried out with respect to the ample for examining an influence of an annealing process (heat treatment) at 250° C. for two hours onto the MR ratio of the magnetoresistance effect film. Specifically, values of the MR ratio (1) upon the film formation (as depo) and (2) after the annealing process (heat treatment) at 250° C. for two hours were obtained, so as to derive a variation (%) of the MR ratio before and after the annealing process (heat treatment).

A measurement sample of 0.4×6 mm was prepared, and resistances were measured according to a four-terminal method while applying an external magnetic field in a direction perpendicular to the current within the film plane and changing it from −300 to 300 Oe. The MR ratio ΔR/R was derived from the measured resistances. Specifically, the MR ratio ΔR/R was calculated using the following equation.

$$\Delta R/R = (pmax - psat) \times 100 / psat \ (\%)$$

wherein pmax represents the maximum resistivity and psat represents the minimum resistivity.

(Preparation of Inventive Samples III-2 to III-6)

Inventive Samples III-2, III-3, III-4, III-5 and III-6 were prepared in the same manner as Inventive Sample III-1, only changing the thickness of the protective layer 80 used in Inventive Sample III-1 to 1 nm, 2 nm, 3 nm, 4 nm and 8 nm, respectively.

(Preparation of Comparative Samples III-1 to III-4)

Comparative Samples III-1, III-2, III-3 and III-4 were prepared in the same manner as Inventive Sample III-1, changing the material of the protective layer 80 used in Inventive Sample III-1 from Rh to Ta and further changing the thickness thereof to 2 nm, 3 nm, 4 nm and 5 nm, respectively.

The MR ratios measured with respect to the foregoing samples (1) upon the film formation (as depo) and (2) after the annealing process (heat treatment) at 250° C. for two hours, as well as variations (%) thereof before and after the annealing process (heat treatment) are shown in Table 3 below.

TABLE 3

| Sample No. | Protective layer Material | Thickness (nm) | as depo MR Ratio (%) | after annealing MR Ratio (%) | MR variation (%) |
|---|---|---|---|---|---|
| Inventive example III-1 | Rh | 5 | 4.55 | 4.16 | −8.5 |
| Inventive example III-2 | Rh | 1 | 6.80 | 6.02 | −11.5 |
| Inventive example III-3 | Rh | 2 | 6.28 | 5.56 | −10.9 |
| Inventive example III-4 | Rh | 3 | 5.86 | 5.26 | −10.2 |
| Inventive example III-5 | Rh | 4 | 5.42 | 6.34 | −9.3 |
| Inventive example III-6 | Rh | 8 | 3.90 | 3.66 | −6.1 |
| Comparative example III-1 | Ta | 2 | 6.82 | 4.98 | −28.0 |
| Comparative example III-2 | Ta | 3 | 6.93 | 5.08 | −26.7 |
| Comparative example III-3 | Ta | 4 | 6.96 | 5.14 | −26.2 |
| Comparative example III-4 | Ta | 5 | 6.99 | 5.23 | −25.2 |

From the results shown in Table 3, it is seen that in case of the material of the protective layer being Rh, the variation of the MR ratio was largely improved as compared with the Ta protective layer. Particularly, in case of the thickness being 5 nm, the high effect was confirmed that the variation of the MR ratio was −8.5% in case of Rh while it was −25% in case of Ta. The upper limit of the thickness of the Rh layer is about 5 nm where the MR ratio of no less than 4.0% can be obtained after annealing. The lower limit of the thickness needs to be no less than about 1 nm for fully achieving a function of preventing oxidation. Preferably, it is no less than 2 nm.

[Example IV]

Figure 7:
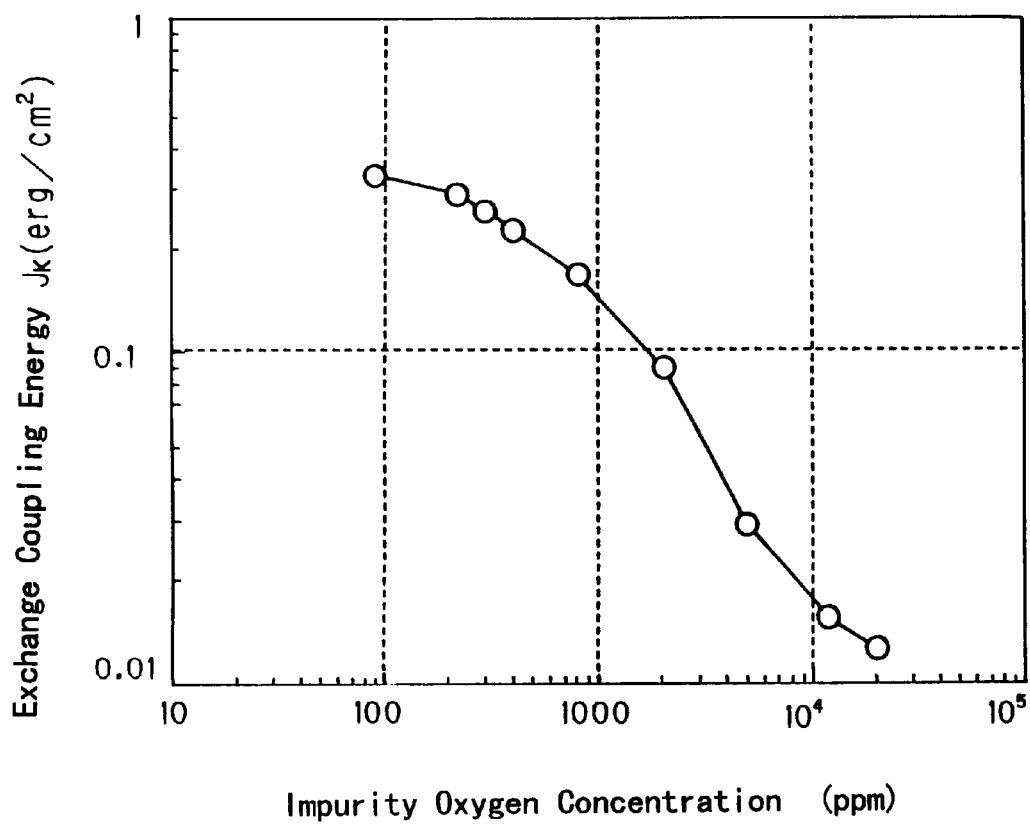
FIG. 7 is a graph showing the results of examining an influence of the concentration of oxygen contained in an antiferromagnetic layer as impurities upon the exchange coupling energy Jk.
Figure 8:
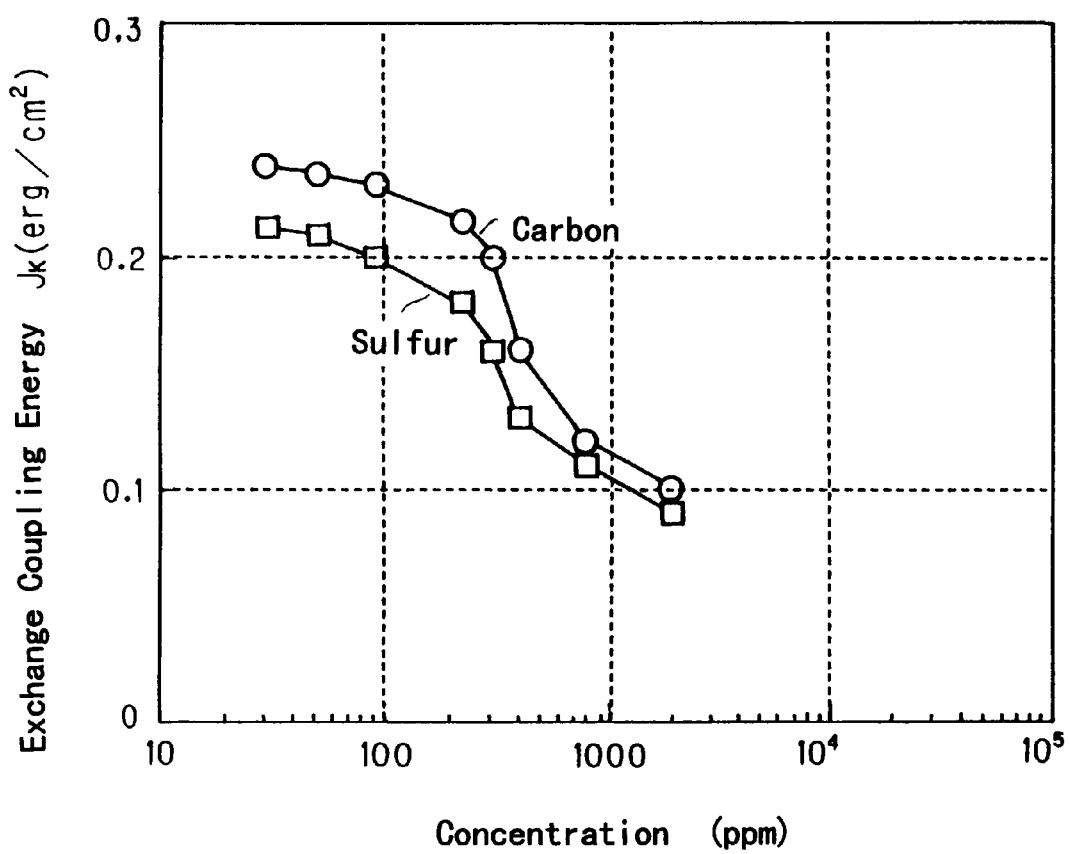
FIG. 8 is a graph showing the results of examining influences of the concentrations of carbon and sulfur contained in an antiferromagnetic layer as impurities upon the exchange coupling energy Jk.
Figure 9:
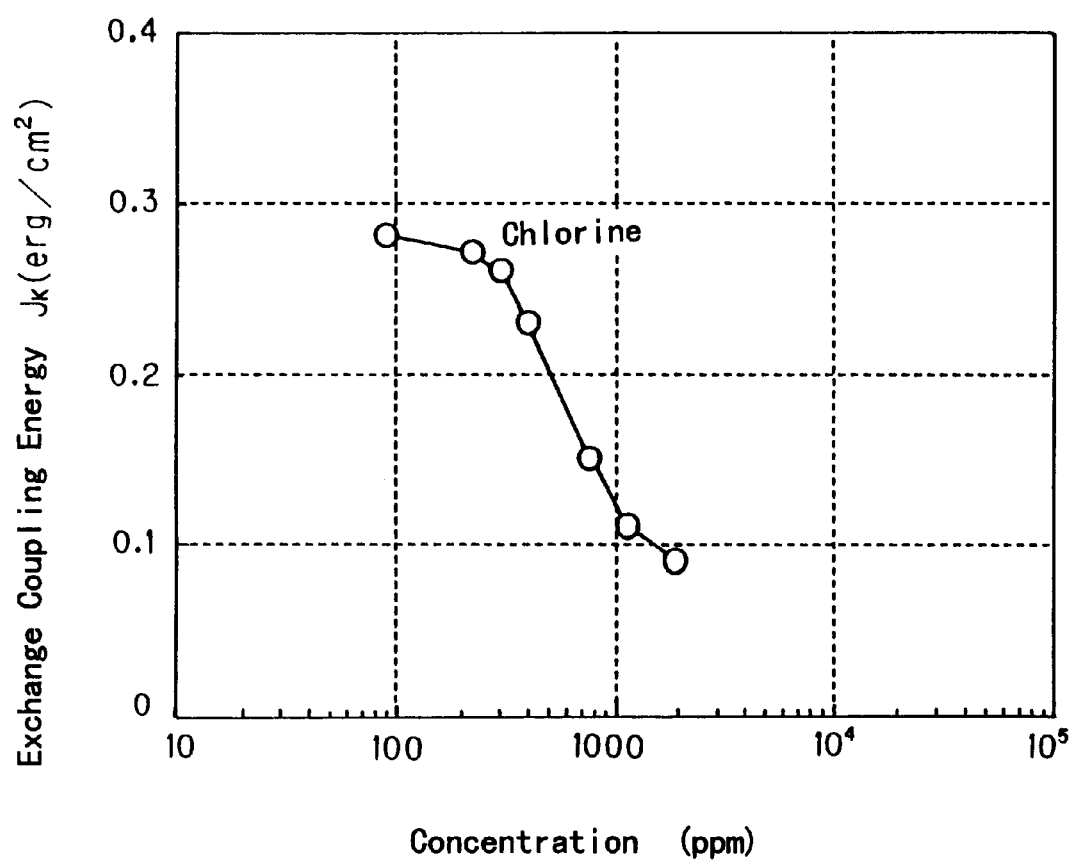
FIG. 9 is a graph showing the results of examining an influence of the concentration of chlorine contained in an antiferromagnetic layer as impurities upon the exchange coupling energy Jk.

According to the preparation of Inventive Sample I-1, various samples were prepared by variously changing the sputtering condition so as to provide the samples having different concentrations of impurities (oxygen, carbon, sulfur, chlorine) contained in the antiferromagnetic layer. Using the samples, an influence of the impurity concentration of the antiferromagnetic layer upon the exchange coupling energy Jk was examined. The results are shown in graphs of FIGS. 7 to 9. From the results, it is seen that the oxygen concentration needs to be suppressed to 1 to 2,000 ppm, the carbon concentration to 1 to 2,000 ppm, the sulfur concentration to 1 to 1,000 ppm and the chlorine concentration to 1 to 2,000 ppm for obtaining the exchange coupling energy Jk of no less than 0.1 erg/cm².

It is confirmed that such impurity concentration suppression can be realized by sputtering a target in a vacuum film forming apparatus degassed to an ultimate pressure of no higher than $2 \times 10^{-9}$ Torr and under an atmosphere of sputtering gas introduced upon film formation, wherein the oxygen concentration of the target is set to no more than 600 ppm, the total concentration of impurities in the sputtering gas is set to no more than 100 ppb and the concentration of $H_2O$ in the sputtering gas is set to no more than 40 ppb.

[Example V]

A spin valve (SV) type magnetoresistance effect type head as shown in FIG. 5 was prepared.

First, a spin valve type magnetoresistance effect film was prepared. Specifically, the film sample was prepared by stacking, on a substrate 5 (AlTiC with $Al_2O_3$), an under layer 7 (Ta; 5 nm in thickness), a soft magnetic layer 20 (NiFe; 7 nm in thickness), a non-magnetic metal layer 30 (Cu; 2.5 nm in thickness), a ferromagnetic layer 40 (Co; 3 nm in thickness), an antiferromagnetic layer 50 ($Ru_3Rh_{15}Mn_{82}$; 10 nm in thickness) and a protective layer 80 (Rh; 5 nm in thickness) in the order named, so as to prepare the magnetoresistance effect type head.

In this magnetoresistance effect type head, an upper shield layer and a lower shield layer were formed via an $Al_2O_3$ gap film, respectively.

In this magnetoresistance effect type head, an inductive head portion as shown in FIG. 5 was formed. Specifically, NiFe was formed to have a thickness of 10 nm as linking soft magnetic layers 520, and then, $Ru_5Rh_{15}Mn_{20}$ was formed on the linking soft magnetic layers 520 to have a thickness of 10 nm as antiferromagnetic layers 800. Thereafter, electrode portions 100 made of Ta were further formed on the antiferromagnetic layers 800 so that the spin valve (SV) type magnetoresistance effect type head was prepared as shown in FIG. 5. Subsequently, in vacuum of $10^{-7}$ Torr, the head was cooled from 200° C. while applying a magnetic field of 200 Oe in an in-plane direction perpendicular to a measurement current direction, so as to induce the pinning effect for the ferromagnetic layer. A track width of the magnetoresistance effect type head was set to 1.2 μm, while a height of the MR element was set to 1 μm and a sense current was set to 4 mA.

A relationship between the applied magnetic field and the output voltage was examined using the magnetoresistance effect type head, and the output voltage of 2.0 mV was confirmed. This is a very large value which is about twice the normal spin valve head.

[Example VI]

Figure 10:
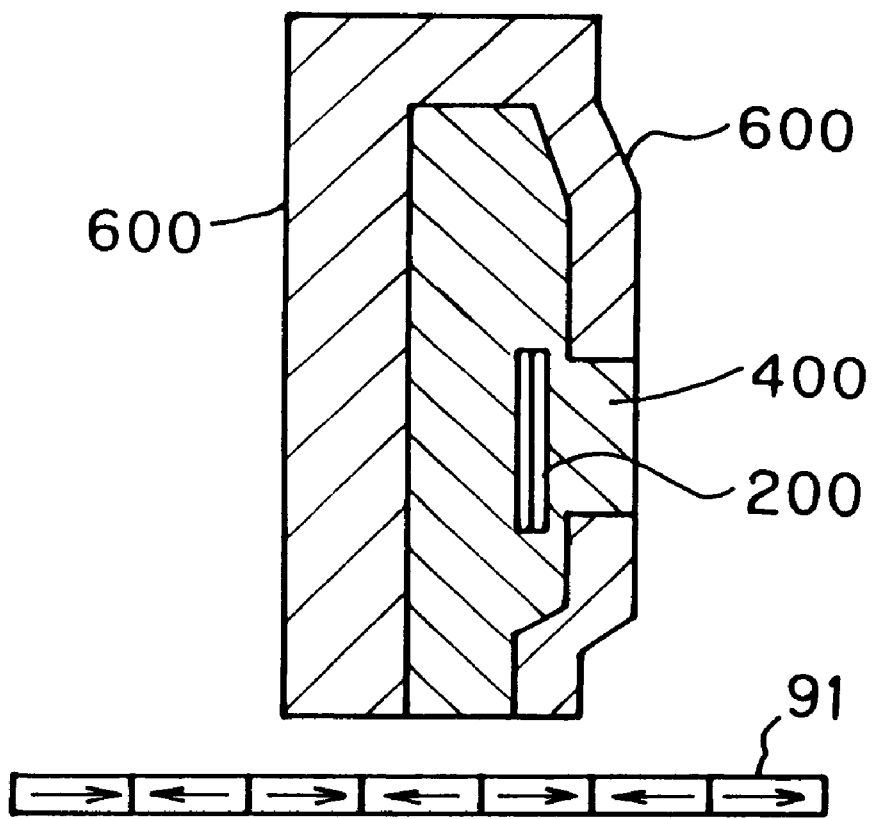
FIG. 10 is a partially omitted sectional view showing an example, wherein a magnetoresistance effect film (magnetic multilayered film) according to the present invention is applied to a yoke-type MR head.

FIG. 10 shows an example in which the magnetoresistance effect film of the present invention is applied to a yoke-type MR head. In this example, a cutout is formed at a portion of yokes 600, 600, and a magnetoresistance effect film 200 is formed therebetween via a thin insulation film 400. The magnetoresistance effect film 200 is provided with electrodes (not shown) for feeding a current in a direction parallel to or perpendicular to a magnetic path formed by the yokes 600, 600.

[Example VII]

Figure 11:
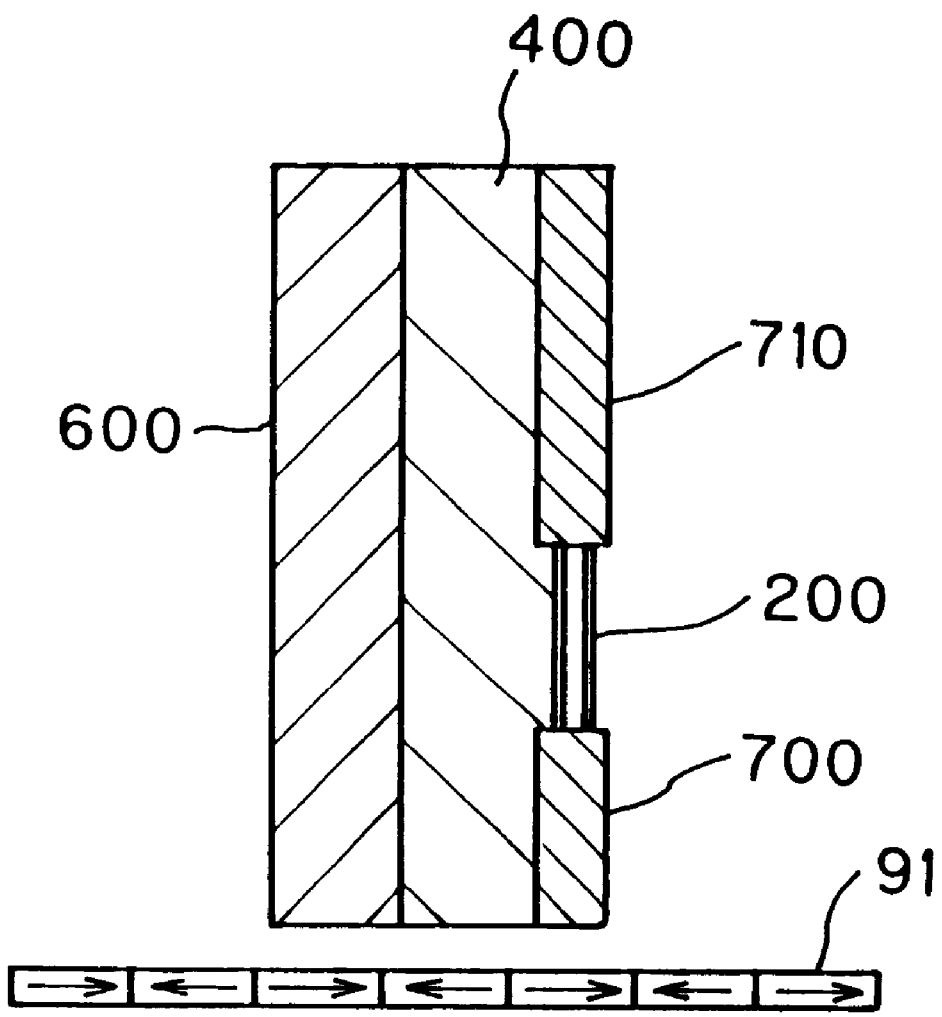
FIG. 11 is a partially omitted sectional view showing an example, wherein a magnetoresistance effect film (magnetic multilayered film) according to the present invention is applied to a flux guide type MR head.

FIG. 11 shows an example in which the magnetoresistance effect film of the present invention is applied to a flux guide type MR head. In this example, a magnetoresistance effect film 200 is magnetically coupled to flux guide layers 700 and 710 of high resistivity and high permeability. The flux guide layers 700 and 710 indirectly conduct a signal magnetic field to the magnetoresistance effect film 200. Further, via a non-magnetic insulation layer 400, a flux back guide layer 600 (escape path for magnetic flux passing the magnetoresistance effect film 200) is formed. Flux back guide layers 600 may be provided at both sides the magnetoresistance effect film 200 via the non-magnetic insulation layer 400. A feature of this head resides in that a magnetic field detecting portion thereof can approximate a recording medium in a nearly abutting fashion so that the high output can be obtained.

From the foregoing results, the effect of the present invention is clear. Specifically, according to the present invention, in the spin valve type magnetoresistance effect film, the antiferromagnetic layer is made of $M_xMn_{100-x}$ wherein M represents at least one selected from Ru, Rh, Re, Pt, Pd, Au, Ag, Fe, Ni, Ir and Cr, and $15 \leq x \leq 58$ (unit of x: atomic %), and the protective layer formed thereon is made of at least one selected from Rh, Ru, Zr and Ti. With this arrangement, the magnetoresistance effect film highly excellent in thermal stability and small in deterioration of the MR ratio, as well as the magnetoresistance effect type head having such a magnetoresistance effect film can be obtained.

What is claimed is:

1. A spin valve magnetoresistance effect film comprising a multilayered film including a non-magnetic metal layer, a ferromagnetic layer formed on one surface of the non-magnetic metal layer, a soft magnetic layer formed on the other surface of said non-magnetic metal layer, an antiferromagnetic layer which is formed on a surface of said ferromagnetic layer remote from the other surface thereof abutting said non-magnetic metal layer so as to pin a direction of magnetization of said ferromagnetic layer, and a protective layer which is formed on a surface of said antiferromagnetic layer remote from he other surface thereof abutting said ferromagnetic layer, wherein said antiferromagnetic layer substantially consists of $M_xMn_{100-x}$ where M represents at least one metal selected from the group consisting of Ru, Rh, Re, Pt, Pd, Au, Ag, Fe, Ni, Ir and Cr, and $15 \leq x \leq 58$ (unit of x: atomic %), and wherein said protective layer consists of at least one metal selected from the group consisting of Rh, Ru, Zr, Ti.

2. The magnetoresistance effect film according to claim 1, wherein said antiferromagnetic layer substantially consists of $M_xMn_{100-x}$ where M represents at least one selected from Ru, Rh, Re, Pt, Pd, Au, Ag, Fe, Ni, Ir and Cr, and $15 \leq x \leq 58$ (unit of x: atomic %), and wherein said protective layer is made of at least one selected from Rh and Ru.

3. The magnetoresistance effect film according to claim 1, wherein said antiferromagnetic layer substantially consists of $Ru_xM_yMn_z$ where M represents at least one selected from Rh, Pt, Pd, Au, Ag, Re, Ni and Ir, $1 \leq x \leq 30$, $1 \leq y \leq 30$, $69 \leq z \leq 90$, $10 \leq x+y \leq 31$ (unit of x, y, z: atomic %), and wherein said protective layer is made of at least one selected from Rh and Ru.

4. The magnetoresistance effect film according to claim 1, wherein said antiferromagnetic layer substantially consists of $M_xMn_{100-x}$ where M represents at least one selected from Ru, Rh, Re, Pt, Pd, Au, Ag, Fe, Ni, Ir and Cr, and $15 \leq x \leq 58$ (unit of x: atomic %), and wherein said protective layer is made of at least one selected from Zr and Ti.

5. The magnetoresistance effect film according to claim 1, wherein a thickness (t) of said protective layer is set in the range of $1 \text{ nm} \leq t \leq 5$ nm.

6. The magnetoresistance effect film according to claim 1, wherein said antiferromagnetic layer contains oxygen as impurities and a concentration of oxygen contained in said antiferromagnetic layer is set to 1 to 2,000 atomic ppm.

7. The magnetoresistance effect film according to claim 6, herein said antiferromagnetic layer further contains carbon, sulfur and chlorine as impurities, and wherein a concentration of carbon contained in said antiferromagnetic layer is set to 1 to 2,000 atomic ppm, a concentration of sulfur contained in said antiferromagnetic layer is set to 1 to 1,000 atomic ppm, and a concentration of chlorine contained in said antiferromagnetic layer is set to 1 to 2,000 atomic ppm.

8. The magnetoresistance effect film according to claim 1, wherein said antiferromagnetic layer is formed by a sputtering method in a vacuum film forming apparatus degassed to an ultimate pressure of no more than $2 \times 10^{-9}$ Torr and under an atmosphere of sputtering gas introduced upon film formation, using a target of an oxygen concentration of no more than 600 ppm, and wherein the total concentration of impurities in the sputtering gas is set to no more than 100 ppb and a concentration of $H_2O$ in the sputtering gas is set to no more than 40 ppb.

9. The magnetoresistance effect film according to claim 1, wherein said magnetoresistance effect film has a multilayered structure having said soft magnetic layer, said non-magnetic metal layer, said ferromagnetic layer, said antiferromagnetic layer and said protective layer in the order named from a side of a substrate.

10. A magnetoresistance effect head comprising a magnetoresistance effect film, conductive films and electrode portions, wherein said conductive films are conductively connected to said magnetoresistance effect film through said electrode portions, and said magnetoresistance effect film which comprises a multilayer film is a spin valve magnetoresistance effect film which comprises a multilayered film including a non-magnetic metal layer, a ferromagnetic layer formed on one surface of the non-magnetic metal layer, a soft magnetic layer formed on the other surface of said non-magnetic metal layer, an antiferromagnetic layer which is formed on a surface of said ferromagnetic layer remote from the other surface thereof abutting said non-magnetic metal layer so as to pin a direction of magnetization of said ferromagnetic layer, and a protective layer which is formed on a surface of said antiferromagnetic layer remote from he other surface thereof abutting said ferromagnetic layer, wherein said antiferromagnetic layer substantially consists of $M_xMn_{100-x}$ where M represents at least one metal selected from the group consisting of Ru, Rh, Re, Pt, Pd, Au, Ag, Fe, Ni, Ir and Cr, and $15 \leq x \leq 58$ (unit of x: atomic %), and wherein said protective layer consists of at least one metal selected from the group consisting of Rh, Ru, Zr, Ti.

11. The magnetoresistance effect head according to claim 10, wherein said antiferromagnetic layer substantially consists of $M_xMn_{100-x}$ where M represents at least one selected from Ru, Rh, Re, Pt, Pd, Au, Ag, Fe, Ni, Ir and Cr, and $15 \leq x \leq 58$ (unit of x: atomic %), and wherein said protective layer is made of at least one selected from Rh and Ru.

12. The magnetoresistance effect head according to claim 10, wherein said antiferromagnetic layer substantially consists of $Ru_xM_yMn_z$ where M represents at least one selected from Rh, Pt, Pd, Au, Ag, Re, Ni and Ir, $1 \leq x \leq 30$, $1 \leq y \leq 30$, $69 \leq z \leq 90$, $10 \leq x+y \leq 31$ (unit of x, y, z: atomic %), and wherein said protective layer is made of at least one selected from Rh and Ru.

13. The magnetoresistance effect head according to claim 10, wherein said antiferromagnetic layer substantially consists of $M_xMn_{100-x}$ where M represents at least one selected from Ru, Rh, Re, Pt, Pd, Au, Ag, Fe, Ni, Ir and Cr, and $15 \leq x \leq 58$ (unit of x: atomic %), and wherein said protective layer is made of at least one selected from Zr and Ti.

14. The magnetoresistance effect head according to claim 10, wherein a thickness (t) of said protective layer is set in the range of $1 \text{ nm} \leq t \leq 5 \text{ nm}$.

15. The magnetoresistance effect head according to claim 10, wherein said antiferromagnetic layer contains oxygen as impurities and a concentration of oxygen contained in said antiferromagnetic layer is set to 1 to 2,000 atomic ppm.

16. The magnetoresistance effect head according to claim 15, wherein said antiferromagnetic layer further contains carbon, sulfur and chlorine as impurities, and wherein a concentration of carbon contained in said antiferromagnetic layer is set to 1 to 2,000 atomic ppm, a concentration of sulfur contained in said antiferromagnetic layer is set to 1 to 1,000 atomic ppm, and a concentration of chlorine contained in said antiferromagnetic layer is set to 1 to 2,000 atomic ppm.

17. The magnetoresistance effect head according to claim 10, wherein said antiferromagnetic layer is formed by a sputtering method in a vacuum film forming apparatus degassed to an ultimate pressure of no more than $2 \times 10^{-9}$ Torr and under an atmosphere of sputtering gas introduced upon film formation, using a target of an oxygen concentration of no more than 600 ppm, and wherein the total concentration of impurities in the sputtering gas is set to no more than 100 ppb and a concentration of $H_2O$ in the sputtering gas is set to no more than 40 ppb.

18. The magnetoresistance effect head according to claim 10, wherein said multilayered magnetoresistance effect film is subjected to a heat treatment in the range of 150° C. to 300° C.

19. The magnetoresistance effect head according to claim 10, wherein said magnetoresistance effect film has a multilayered structure having said soft magnetic layer, said nonmagnetic metal layer, said ferromagnetic layer, said antiferromagnetic layer and said protective layer in the order named from a side of a substrate.

* * * * *